US012093265B2

(12) United States Patent
Hrastnik

(10) Patent No.: US 12,093,265 B2
(45) Date of Patent: Sep. 17, 2024

(54) SEMANTICS BASED DATA AND METADATA MAPPING

(71) Applicant: SAP SE, Walldorf (DE)

(72) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 142 days.

(21) Appl. No.: 17/391,607

(22) Filed: Aug. 2, 2021

(65) Prior Publication Data

US 2023/0044287 A1 Feb. 9, 2023

(51) Int. Cl.
*G06F 16/2457* (2019.01)
*G06F 16/21* (2019.01)
*G06F 16/242* (2019.01)
*G06F 16/28* (2019.01)

(52) U.S. Cl.
CPC ...... *G06F 16/24573* (2019.01); *G06F 16/211* (2019.01); *G06F 16/2445* (2019.01); *G06F 16/285* (2019.01)

(58) Field of Classification Search
CPC .. G06F 40/30; G06F 16/24573; G06F 16/285; G06F 16/2445; G06F 16/211
See application file for complete search history.

(56) References Cited

U.S. PATENT DOCUMENTS 8,234,619 B2 7/2012 Polly et al.
8,788,533 B2 7/2014 Brunswig et al.
8,924,269 B1 12/2014 Seubert et al.
9,141,517 B2 9/2015 Hrastnik
10,489,024 B2 11/2019 Hrastnik
10,680,983 B2 6/2020 Hrastnik
2005/0268255 A1 12/2005 Hrastnik et al.
2009/0089277 A1* 4/2009 Cheslow ............ G06F 16/3344 707/999.005
2010/0318974 A1 12/2010 Hrastnik et al.
2011/0179026 A1* 7/2011 Mulligen ............. G06F 16/313 707/769
2011/0320191 A1* 12/2011 Makeyev .............. G06Q 30/02 704/9
2012/0117082 A1* 5/2012 Koperda .......... G06F 16/24578 707/E17.084
2012/0159566 A1 6/2012 Hrastnik et al.
(Continued)

*Primary Examiner* — Brittany N Allen
*Assistant Examiner* — William P Bartlett
(74) *Attorney, Agent, or Firm* — Fish & Richardson P.C.

(57) ABSTRACT

The present disclosure involves computer-implemented method, medium, and system for automatically correlating semantically connected data and metadata. One example method includes identifying a document that is to be analyzed using a semantics based mapping (SBM) infrastructure. A matching process is performed for the identified document using the SBM infrastructure, where the matching process identifies a plurality of matching terms within the document, the plurality of matching terms are assigned to a plurality of semantics identifiers (IDs), and each semantics ID corresponds to one or more terms in the plurality of matching terms. Each of the plurality of matching terms is replaced with a respective term ID to generate an updated document. A request to search for a target term in the document is received. The target term is translated to a target term ID based on the SBM infrastructure. The updated document is searched for one or more matching terms.

20 Claims, 12 Drawing Sheets

(56) References Cited

U.S. PATENT DOCUMENTS

2012/0191746 A1* 7/2012 Tashiro .................. G06F 16/30
707/769
2014/0012869 A1 1/2014 Hrastnik
2016/0078072 A1* 3/2016 Saffer ................ G06F 16/2228
707/741
2017/0124065 A1* 5/2017 Cougias ................. G06F 40/30
2020/0192891 A1 6/2020 Hrastnik
2020/0334272 A1 10/2020 Hrastnik
2020/0387667 A1* 12/2020 Oda ..................... G06F 40/289

* cited by examiner

SEMANTICS BASED DATA AND METADATA MAPPING

TECHNICAL FIELD

The present disclosure relates to computer-implemented methods, software, and systems for automatically correlating semantically connected data and metadata.

BACKGROUND

In applications leveraging advanced analysis capabilities, such as fuzzy searches and machine learning algorithms, the correct correlation of semantically connected data and metadata becomes more and more important.

Business data is typically stored in a relational database schema, with the individual data records being captured in dedicated database tables where records are linked by modelled foreign key relationships. Often this structuring reflects the entity relationship model of the applications. This modeling is accurate on metadata level. However, the modeling can require defining foreign key relationships for each occurrence of a foreign key separately. If data from different systems is being collected (e.g. in a data warehouse or data lake), these relations may need to be redefined and enriched for covering all data sources.

Apart from the mere foreign-key relationships of the data and metadata (used herein as "(meta)data"), further aspects can be considered for properly clustering and networking (meta)data. In many business-related cases, these aspects are connected to the semantics of the underlying information.

SUMMARY

The present disclosure involves computer-implemented method, medium, and system for automatically correlating semantically connected data and metadata. One example method includes identifying a document to be analyzed, where the document is to be analyzed using a semantics based mapping (SBM) infrastructure, the SBM infrastructure includes a plurality of terms, and each term of the plurality of terms is associated with a corresponding term identifier (ID). A matching process is performed for the identified document using the SBM infrastructure, where the matching process identifies a plurality of matching terms within the document that are defined in the plurality of terms, the plurality of matching terms are assigned to a plurality of semantics identifiers (IDs), and each semantics ID corresponds to one or more terms in the plurality of matching terms. Each of the plurality of matching terms in the document is replaced with a respective term ID associated with a corresponding term in the plurality of terms to update the document. A search request to search for a target term in the document is received. The target term is translated to a target term ID based on the SBM infrastructure. The updated document is searched for one or more matching terms. The one or more matching terms are returned.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

A Semantics-based Data and Metadata Mapping (SBM) infrastructure can be established to leverage semantics of the natural language for structuring and relating data and metadata. This comprises, for example, the evaluation of synonyms, specializations, and abbreviations with probability factors and classification categories that describe the precision and semantics of the resulting mappings. This foundation helps to analyze business data and metadata. Supplementing information from other information sources, for example, additional metadata of modelled key definitions, can be used for improving the derived information as well as for gaining additional insights into given information. For example, as applications continue to leverage advanced analysis capabilities, and the correct correlation of semantically connected data and metadata becomes more and more important, reliable automated structuring and qualification mechanisms are needed to be established in order to be able to cope with the steadily increasing amount of information (for example, when grooming sensor data gathered in a data lake).

Apart from the mere foreign-key relationships of the (meta)data, there are further aspects that can be considered for properly clustering and networking (meta)data. In many business-related cases, these aspects are connected to the semantics of the underlying information. However, such information is usually not manifested in a way that it can be evaluated programmatically. By providing a semantic-based analysis as provided herein, easier and more efficient connections can be defined, with simpler and more efficient searches then being available.

Furthermore, the semantics knowledge can be integrated into the processing of machine learning algorithms and fuzzy searches and alike in order to make them more precise and efficient. In some examples, the knowledge of the semantic relationships can help identifying relevant patterns and particularities, which can be used for training a predictive model.

Besides the capability to analyze structured data such as data persisted in relational database tables, whose columns hold distinct and well-classified information, the SBM can also be applied on unstructured data like those contained in email communications or in voice recordings, and can support analyses thereof.

Apart from providing insights into business related questions, the ability to interpret semantics can also serve for checking the consistency of data and metadata itself, and thus for improving the quality of the data and metadata.

Figure 1:
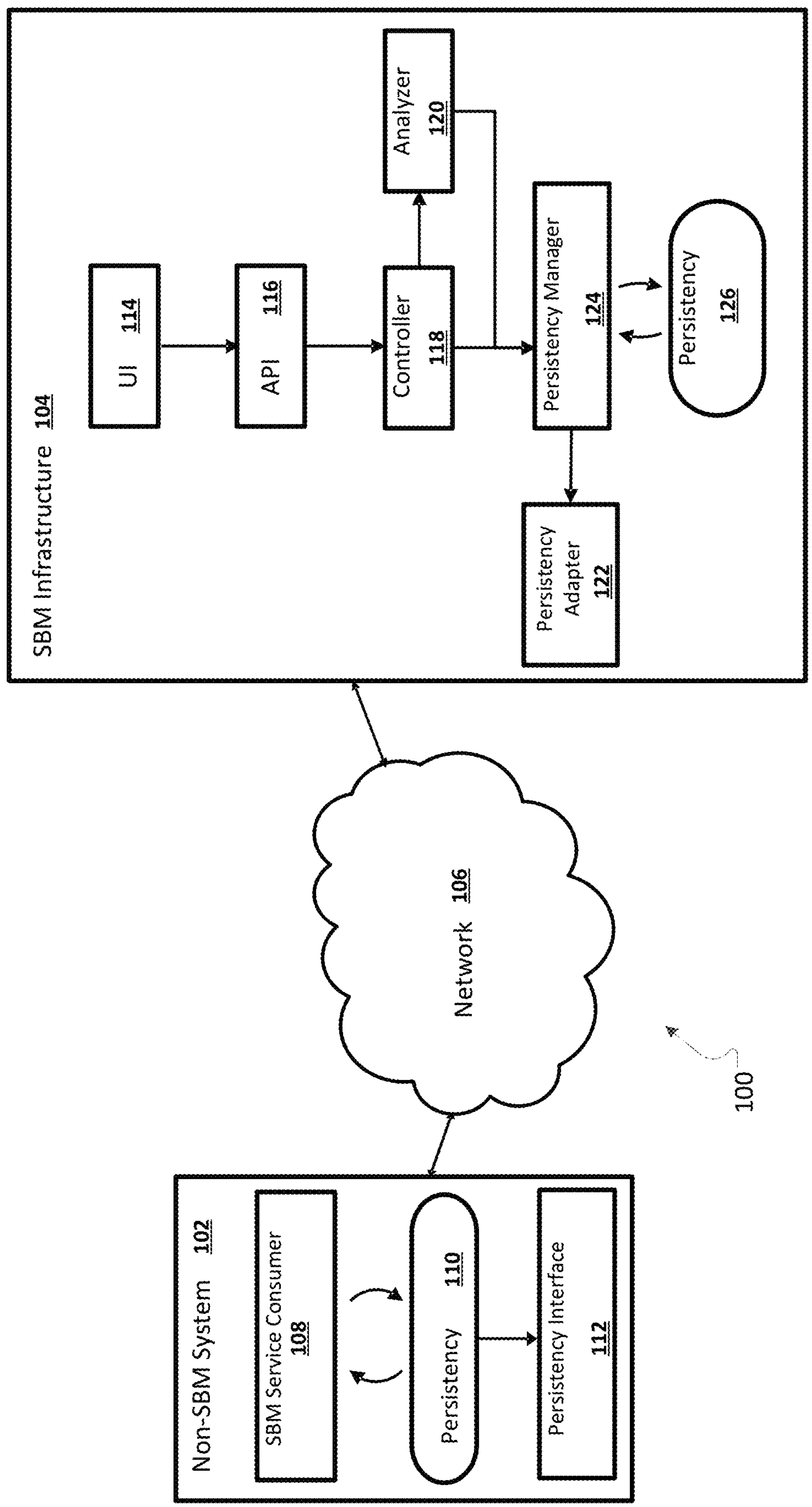
FIG. 1 is a diagram illustrating an example system for correlating semantically connected data and metadata using a Semantics-based Data and Metadata Mapping (SBM) infrastructure, in accordance with example implementations of this specification.

FIG. 1 is a diagram illustrating an example system 100 for correlating semantically connected data and metadata using a Semantics-based Data and Metadata Mapping (SBM) infrastructure, and which can be used to execute various implementations of this specification. The illustrated example system 100 includes a non-SBM system 102, a SBM infrastructure 104, and a network 106. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems. Although shown separately, in some implementations, functionality of two or more systems or servers may be provided by a single system or server. In some implementations, the functionality of one illustrated system or server may be provided by multiple systems or servers.

The non-SBM system 102 is configured to interact with the SBM infrastructure 104 through the network 106. In some implementations, the SBM service consumer 108 interacts with a user to receive requests for using the SBM infrastructure 104. The SBM service consumer 108 may analyze data stored in persistency 110 using SBM information fetched from the SBM infrastructure 104. In some implementations, the persistency 110 stores data and metadata external to the SBM infrastructure 104 that can be analyzed by the SBM infrastructure 104. In some implementations, the persistency interface 112 provides access to data and metadata stored in persistency 110.

The SBM infrastructure 104 is configured to automatically correlate semantically connected data and metadata. In some implementations, the user interface (UI) 114 allows displaying information and performing functionality of SBM. The Application Programming Interface (API) 116 supports local and remote access to the functionality of the SBM infrastructure 104. There can be tailored services offered for various functions that are supported by the SBM infrastructure 104. In some implementations, the controller 118 orchestrates the processing within the SBM infrastructure 104. In some implementations, the analyzer 120 evaluates data and metadata by applying SBM-based rules, and allows deriving and matching terms and contexts, as well as establishing relationships. In some implementations, the analyzer 120 supports various parsers for standard document types like CSV, XML, JSON, as well as for standard protocols/services like Structured Query Language (SQL) and Open Data Protocol (OData). In some implementations, the persistency manager 124 handles all accesses to the persistency 126, and distributes requests to local and remote databases. In some implementations, the persistency 126 includes database tables for the SBM-specific semantics, terms, contexts, probability factors, grammar rules, other information to be analyzed, and caches with preprocessed data. In some implementations, the persistency adapter 122 allows integration of external databases to include their respective data and metadata into analyses without replicating this information to the persistency 126. For example, the persistency adapter 122 could connect to the persistency interface 112.

There may be any number of non-SBM systems 102 associated with, or external to, the example system 100. For example, while the illustrated example system 100 includes one non-SBM system 102, alternative implementations of the example system 100 may include multiple non-SBM system 102 communicably coupled to one (or multiple) SBM infrastructure(s) 104 and/or the network 106, or any other number suitable to the purposes of the example system 100. Additionally, there may also be one or more additional non-SBM system 102 external to the illustrated portion of example system 100 that are capable of interacting with the example system 100 via the network 106. Further, the term "non-SBM system" and "user" may be used interchangeably as appropriate without departing from the scope of this disclosure. In such solutions, the various non-SBM systems 102 may be provided individual SBM solutions, as well as solutions where the semantic information included in the SBM system 104 can be shared, in part, among some or all of the non-SBM systems 102.

The features described in this disclosure can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. In some implementations, one or both of the non-SBM system or the SBM infrastructure can be implemented in a server, a set of servers, or a cloud-based environment. Any suitable communication methods and interactions can be used between those systems to allow remote and local analysis of documents and files.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the claims.

Figure 2:
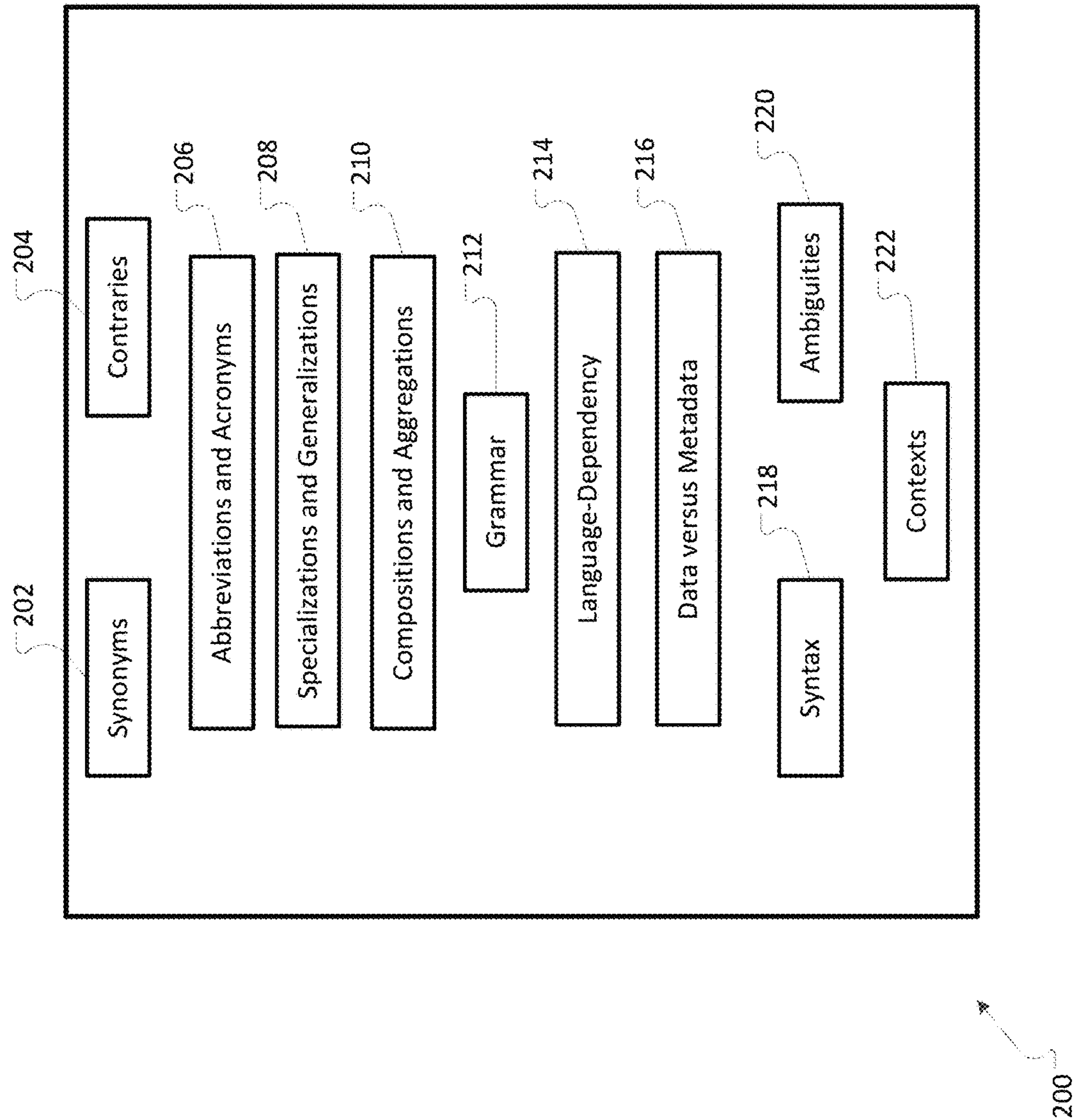
FIG. 2 illustrates an example semantic dictionary that can be used in an SBM infrastructure, in accordance with example implementations of this specification.

FIG. 2 illustrates example semantic dictionary 200 upon which the SBM infrastructure 104 in FIG. 1 is based. In some implementations, the SBM infrastructure 104 in FIG. 1 is primarily based on dictionaries of natural languages, and augments the dictionaries with additional semantic knowledge. The additional semantic knowledge grows and is refined over time and in specific contexts. Since the data and underlying concepts originate from natural languages, persons without programming skills may be able to understand and adapt them based on her/his needs.

In some implementations, the semantic dictionary 200 can index and correlate its content to make them interpretable by the SBM infrastructure 104 in FIG. 1. In some implementations, the semantic dictionary 200 includes at least one of the following components:

Synonyms 202:

Synonyms allow for identifying the same subjects by applying alternative names. For example, "Vendor", "Seller", and "Supplier" may be considered to be the same as semantic synonyms. In other words, these names can be used interchangeably: Information related to the "Supplier" is also valid for the "Seller" and "Supplier" and vice versa. Further, searches and indexing for one of the names may be able to find information associated with either of the other names based on the known synonym relationship. Such relationships can be automatically and/or manually defined.

Contraries 204:

Some terms express the contrary of other terms. Such contraries may on the one hand be used to separate groups of terms from other terms. One can conclude that the corresponding information of the contrary terms will never map.

However, in business such opposites may themselves form valuable information tuples. For example, loss and profit information is both important for financial reporting and may need to be gathered respectively considered both. Note that there may also be special negations that inverse or change the meaning of a term and that need to be considered when mapping terms. For example, the prefix "non" may be used in conjunction with "profit", i.e. "non-profit", or "anti" with "pattern", i.e. "anti-pattern", which both express a different meaning than the unprefixed terms. A plain "fuzzy" logic applied by search engines typically simple matches such occurrences, if the unprefixed term was entered as the search string.

Abbreviations and Acronyms 206:

Abbreviations can be considered to represent a special flavor of synonyms for the same subject. There may be various abbreviations (e.g., locally defined abbreviations, global abbreviations, etc.) for the same unabbreviated word or combination thereof. However, due to the shortening of the involved words, the abbreviation may become ambiguous. Therefore, abbreviations are handled separately from synonyms within the SBM infrastructure. An example of abbreviations is shown in Table 1 below.

TABLE 1

| Term | Abbreviation |
|---|---|
| Partner | Part |
| Extension | Ext |
| Extension | Extn |
| External | Ext |

Acronyms represent abbreviations for grouped words. They are typically constructed from the initial letters of the individual words and often written in upper case letters.

They are used frequently for the sake of brevity as substitutes for the expanded terms. An example of abbreviations is shown in Table 2 below.

TABLE 2

| Acronym | Expanded Term |
|---|---|
| URL | Uniform Resource Locator |
| URI | Universal Resource Identifier |
| UNICEF | United Nations International Children's Emergency Fund |

However, whereas the isolated acronyms can easily be mapped, it may become difficult to identify them (similarly to abbreviations), particularly when composing terms out of them without clear separators. This is illustrated by the Table 3 below.

TABLE 3

| Term | Expanded Term |
|---|---|
| SLA | Service Level Agreement |
| EP | Emergency Patch |
| CostsLastEP | Costs Last Emergency Patch |
| costSLAstep | Cost Service Level Agreement Step |
| COSTSLASTEP | Costs Last Emergency Patch? |
| | Cost Service Level Agreement Step? |
| | . . . |

Specializations and Generalizations 208:

Generalizations gather specialized terms, and specializations decompose generalizations into collections. The specializing criteria may vary in different dimensions that can be distinguished accordingly by the SBM infrastructure. Often, specializations and/or generalizations are realized by qualifiers. Table 4 below lists a few examples.

TABLE 4

| Generalization | Specialization |
|---|---|
| ID | Order ID |
| ID | Product ID |
| ID | Unique ID |
| Order ID | Production Order ID |
| Order ID | Purchase Order ID |

They may however also be defined by specific terms, like illustrated in Table 5 below.

TABLE 5

| Generalization | Specialization |
|---|---|
| Business Partner | Customer |
| Business Partner | Supplier |
| Customer | Ship-To-Party |
| Customer | Sold-To-Party |
| Product | Material |
| Product | Service Product |

In general, the specializations can form tree like refinements starting from generalized terms. For example, "Business Partner" has the specialization "Customer", which in turn has the specialization "Ship-To-Party". Thus, "Ship-To-Party" is a specialization of "Business Partner", too.

Compositions and Aggregations 210:

Compositions and aggregations represent directed logical dependencies of closely related information, and allow constructing the whole from its parts or to navigate from the dependent information to the parent information and vice versa. Table 6 below lists a few examples.

TABLE 6

| Parent | Child |
|---|---|
| Country | Region |
| Sales Order | Sales Order Item |
| Sales Order Item | Sales Order Schedule Line |

For the second and third entries, for example, the semantic meaning is that a sales order item belongs to a sales order, and that a sales order schedule line belongs to a sales order item.

Grammar 212:

There are many specialties, which the grammar introduces. In the following, two of these aspects are described.

Spelling and Punctuation

In some instances, there may be different ways for spelling the same matter. In programming languages words can be combined by camel case notation or separated by underscores. Within written texts, different words may be separated by spaces or hyphens. In addition, written words may carry special characters like dots or periods, such as if abbreviations are used. Depending on whether they introduce a sentence or not, different terms may start with an upper- or lower-case letter. Furthermore, one needs to consider that whereas metadata is typically checked for spelling errors, data entered by users is more likely to contain spelling errors.

In the SBM infrastructure, all these variations of a term may be considered. Therein, even typos may be considered as a variation of a given term. An example is given in Table 7 below.

TABLE 7

| Term | Variation |
|---|---|
| . . . | |
| Sales Order | SalesOrder |
| Sales Order | salesOrder |
| Sales Order | salesorder |
| Sales Order | SALESORDER |
| Sales Order | SALES_ORDER |
| Sales Order | sales_order |
| Sales Order | sales order |
| Sales Order | Sales order |
| Sales Order | Sales ord. |
| Sales Order | Sales Ordre |

However, it should be noted that the spelling can have a significant impact on the semantics, too. For example, "Plantage" would not be mixed up with "Plant Age". Different solutions and SBMs can take into account relevant similarities and differences, and can determine where spelling and punctuation play a role in differentiating terms.

Declination and Conjugation

The same term may appear in different declinations (nouns) or conjugations (verbs). Even though there is a close relationship between the individual words, a distinction may be required.

For example, business data can describe facts that are associated with nouns. For nouns there is a distinction between singular and plural. The latter describes a collection of the individual singular items (e.g., used for defining a table caption "Houses"). It may also be used as a qualifier in enumerations and alike, such as "five houses" or "number of houses: 5". Thus, singular and plural have to be distinguished.

Similarly, different cases have to be distinguished. For example, the "possessive case" usually relates to a characteristic of a subject, whereas the "nominative case" identifies the subject itself.

Language-Dependency 214:

Terms are language dependent. A few examples are illustrated in Table 8 below.

TABLE 8

| English | German |
|---|---|
| Product | Produkt |
| Products | Produkte |
| Material | Material |
| Materials | Materialien |

This does not only hold true for the spelling of the individual words, which the term is constructed from, but also for grammar such as left-to-right versus right-to-left writing styles, punctuation etc. Besides, the same terms can have different translations, whose meanings can vary. Thus, the language-dependency needs to be considered, when mapping terms.

Data Versus Metadata 216:

Metadata is typically checked for proper spelling, consistency, and conciseness. Overall, metadata may leverage a rather limited set of terms for expressing subjects. In contrast, data can be quite diverse when originating from human communication. In this context it is worth mentioning that there is typically another difference between metadata and data. Whereas the metadata is typically defined in a single language (e.g., many development artifacts use English terms), the data captured in the business processes may be defined in various languages often correlated to the logon languages of the individual users. Furthermore, metadata may follow specific spelling/syntax rules defined by programming languages and alike (such that natural language terms for example may need to be written without using separators). As a result, the semantic dictionary distinguishes between data and metadata terms.

Syntax 218:

In general, the same information can be specified in different syntaxes. For example, structured information retrieved from SQL can be serialized in JSON or XML documents. Data transfer protocols like OData can expose the fetched information leveraging their own schemas and metadata.

Within the diverse syntaxes, qualifiers and contexts can be established by various means. For example, namespaces or grouping brackets could be used for qualifying IDs as illustrated in Table 9 below.

TABLE 9

| Semantic ID | Technical ID |
|---|---|
| Sales Order ID | https://www.sap.com/datamodel/sales/salesorder/ID |
| Product ID | https://www.sap.com/datamodel/masterdata/product/ID |
| Sales Order ID | "salesorder": {"ID": . . . } |

The SBM infrastructure can support commonly used syntaxes by providing corresponding parsers.

Ambiguities 220:

Ambiguities in the natural language processing can arise due to different reasons. For example, some terms may be generic, whereas others are specific. A business partner can represent a supplier or a customer. However, a supplier has a different business role compared to a customer.

Sometimes, words themselves can have different meanings. For example, a "plant" can represent a flower or a production facility. For uniquely identifying the matter an additional context/qualifier must be specified such as "ornamental plant" or "production plant".

When dealing with abbreviations and spelling errors additional misinterpretations can arise as described before.

Such ambiguities must be considered in the SBM infrastructure in order to avoid inaccurate mappings.

Contexts 222:

Usage contexts can introduce their own specific terminology. For example, a "Customer" in an Enterprise Resource Planning (ERP) system can be related to a "Patient" in a health care application. The SBM infrastructure allows scoping specific terms by assigning them to flexible contexts. Knowing these contexts in a given use case can improve the quality of the mapping results significantly.

Figure 3:
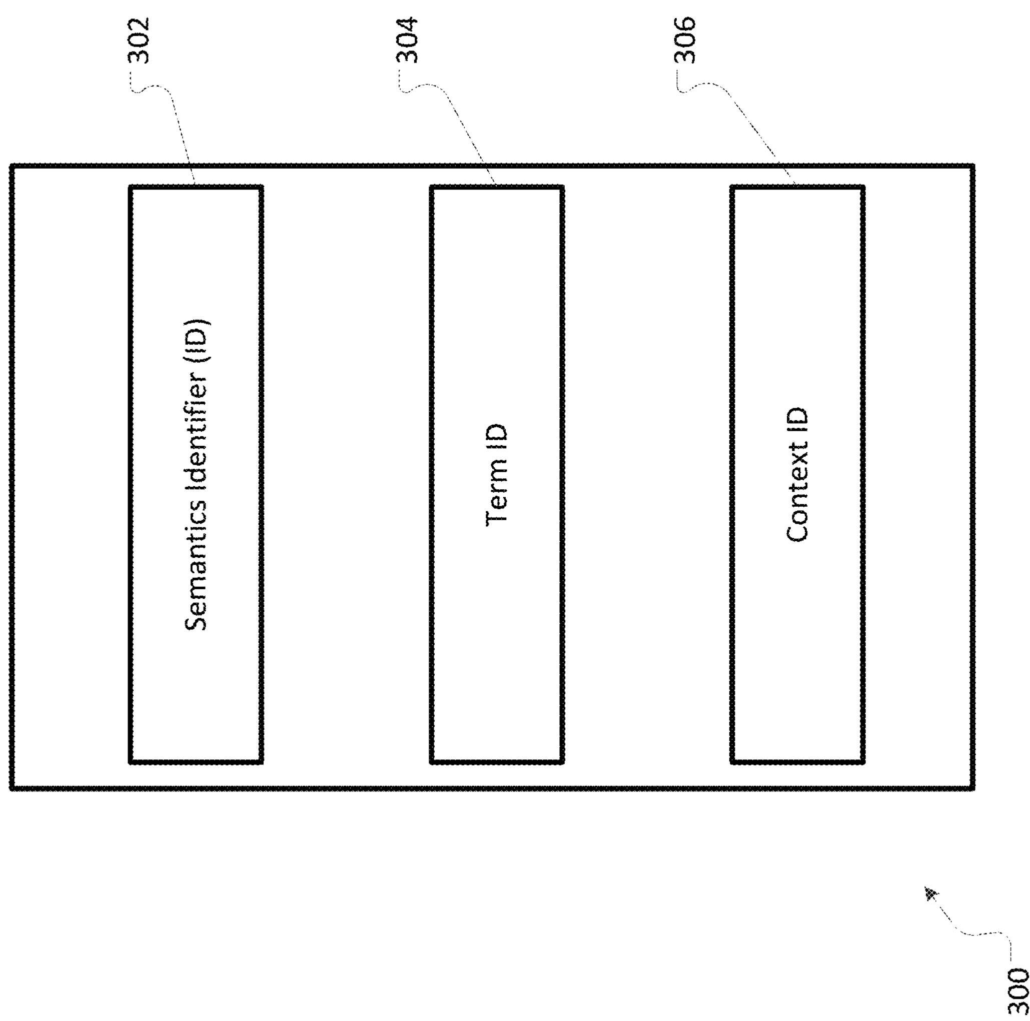
FIG. 3 illustrates an example technical data model that can be used in an SBM infrastructure, in accordance with example implementations of this specification.

FIG. 3 illustrates example technical data model 300 upon which the SBM infrastructure 104 in FIG. 1 is based. In some implementations, the example technical data model 300 includes semantics identifier (ID) 302, term ID 304, and context ID 306 for each subject. The semantics ID 302 acts as a semantic abstraction of the concrete subject (not of the individual term) that in turn can be mapped onto various terms depending on the actual usage contexts.

For example, and as illustrated in Table 10, the abstraction of "sales order item" has the technical ID "653", while the abstraction of "product" has the technical ID "777".

TABLE 10

| Semantics ID | Semantics |
|---|---|
| 653 | sales order item |
| 777 | product |

Furthermore, each term shall get a unique term ID, and can be assigned to its determined semantics (and therefore, corresponding semantics ID). Table 11 illustrates a number of terms with unique term IDs, where some of those unique term IDs are associated with the same semantics ID based on a semantic analysis.

TABLE 11

| Term ID | Term | Semantics ID |
|---|---|---|
| 324 | sales order item | 653 |
| 325 | item of sales order | 653 |
| 326 | SalesOrderItem | 653 |
| 327 | Kundenauftragsposition | 653 |
| 894 | product | 777 |
| 895 | Produkt | 777 |

Variations of these terms may be captured as additional terms or, if no specific handling is required, by some pattern matches. For the sake of brevity and clarity, the SBM infrastructure allows defining the admissible alternative spelling options by predefined patterns like case-insensitive, case-insensitive initials, word separators etc., examples of which are illustrated in Table 12 below.

TABLE 12

| Term ID | Term | Matching Cases | Matching Separators |
|---|---|---|---|
| . . . | | | |
| 345 | sales order | CASE_INSENSITIVE | UNDERSCORE, SPACE, NONE |
| 346 | Sales ord. | | |
| 347 | Sales Ordre | | |
| . . . | | | |

The depicted content in Table 12 covers even more alternatives than the content of Table 7 presented in "Spelling and Punctuation".

The captured terms may have different origins and usages, which need to be distinguished. The most prominent differentiator is the language. Another dimension of the terms is the distinction between data and metadata. In business applications, additional differentiators may be industry- and country-specific terminologies. However, in the concrete use cases there may even be other dimensions to be distinguished. Since all these dimensions and their applications may vary significantly, they cannot be foreseen, but they can be handled in a flexible manner.

The SBM infrastructure defines them as a context that receives a technical context ID and acts as another filter criterion in semantic analyses.

For example, the following contexts may be defined as in Table 13 below:

TABLE 13

| Context ID | Language | MetadataOrData | Industry |
|---|---|---|---|
| 145 | English | Metadata | Sales and Distribution |
| 146 | English | Data | * |
| 147 | German | * | * |
| 148 | English | * | * |

Therein, * indicates an unrestricted usage option. Note that the contexts might be defined by using an extensible relational table or by using JSON definitions, among others. However, each individual context can be identified by a technical key (context ID).

The three identifiers (semantics ID 302, term ID 304, and context ID 306) are the three pillars of the information captured by the technical data model 300. These identifiers support efficient and stable storage of relations as well as efficient runtime evaluations during matching. For example, synonyms could be captured as in Table 14 below. Note that the information captured in brackets is added for improving readability.

TABLE 14

| Semantics ID | Term ID |
|---|---|
| 653 (sales order item) | 324 (sales order item) |
| 653 (sales order item) | 325 (item of sales order) |
| 653 (sales order item) | 326 (SalesOrderItem) |
| 653 (sales order item) | 327 (Kundenauftragsposition) |
| 777 (product) | 894 (product) |
| 777 (product) | 895 (Produkt) |

The terms themselves can have relations, like the generalization/specialization of compositional child/parent relationships. They could be expressed as in Table 15 below.

TABLE 15

| Generalization Term ID | Specialization Term ID |
|---|---|
| 899 (Product) | 452 (Material) |
| 546 (Business Partner) | 570 (Customer) |

Semantics as well as the terms can be assigned to contexts. This is illustrated for the before-mentioned terms and contexts in Table 16 below.

TABLE 16

| Term ID | Context ID |
|---|---|
| 326 (SalesOrderItem) | 145 (English, Metadata . . . ) |
| 324 (sales order item) | 146 (English, Data) |
| 327 (Kundenauftragsposition) | 147 (German) |
| 894 (product) | 148 (English) |
| 895 (Produkt) | 147 (German) |

In general, semantics, terms, and contexts could be associated and used with different probabilities. These probabilities can express the accuracy of a match, and can be captured by corresponding factors that can be attached to the semantics, terms and contexts and the combinations thereof. They may also be assigned to the directed relations of terms like from the generalization to the specialization. Table 17 below shows an example.

TABLE 17

| Term ID | Context ID | Probability Factor |
|---|---|---|
| 326 (SalesOrderItem) | 145 (English, Metadata . . . ) | 1 |
| 894 (product) | 147 (German) | 0.1 |

The first line indicates that the term SalesOrderItem has a high accuracy when mapping it in the context of an English metadata document, whereas the term "product" has only a low probability to be found in a German data set. In this context, the term "product" likely represents a typo for the German term "Produkt", for example.

The overall accuracy of a match is defined by the result of multiplying these factors. The factors are configurable by the consumers of the SBM infrastructure, and may also be defined specifically for a given evaluation. In order to support an initial filling of these factors, one can apply different strategies such as deriving the factors by calculating the inverse of the number of specializations for predicting the likelihood of their occurrences from the metadata. The factors may also be derived from the actual data distribution in the system. The SBM infrastructure may also support grooming these factors by applying machine learning algorithms, among other techniques.

Business related data is usually well-structured. This holds true also for data being gathered in data lakes. The concrete structuring mechanism can vary though. For example, data may be stored as a comma separated file by spreadsheet applications, in which column captions classify the values in each column. In XML and JSON documents, values are assigned to named structuring elements that are organized hierarchically. In a SQL-database systems, table schemas describe the content of the individual tables/table columns.

Note that structured content is not restricted to the persisted information, but can also consider the information exchange. For example, OData services define properties that serve for providing or supplying values.

When mapping values, one can basically follow two distinct approaches. On the one hand, one could try to map information by first mapping terms used in the metadata. For example, one could search for nouns like "Product" and "Supplier" in documents like emails and then relate their found occurrences to their assigned values like "4711" in sentences like " . . . I order 3 pieces of product 4711 for a price of . . . ."

On the other hand, one could use structured information—like the data records in an entity table—to match the values contained therein to the concrete usages of these values. Following this approach, one could also relate the identifier "4711" stored in the data base table of the product in the following text " . . . I order 3 pieces of 4711 for a price of . . . " to the specific instance of entity "Product".

Figure 4:
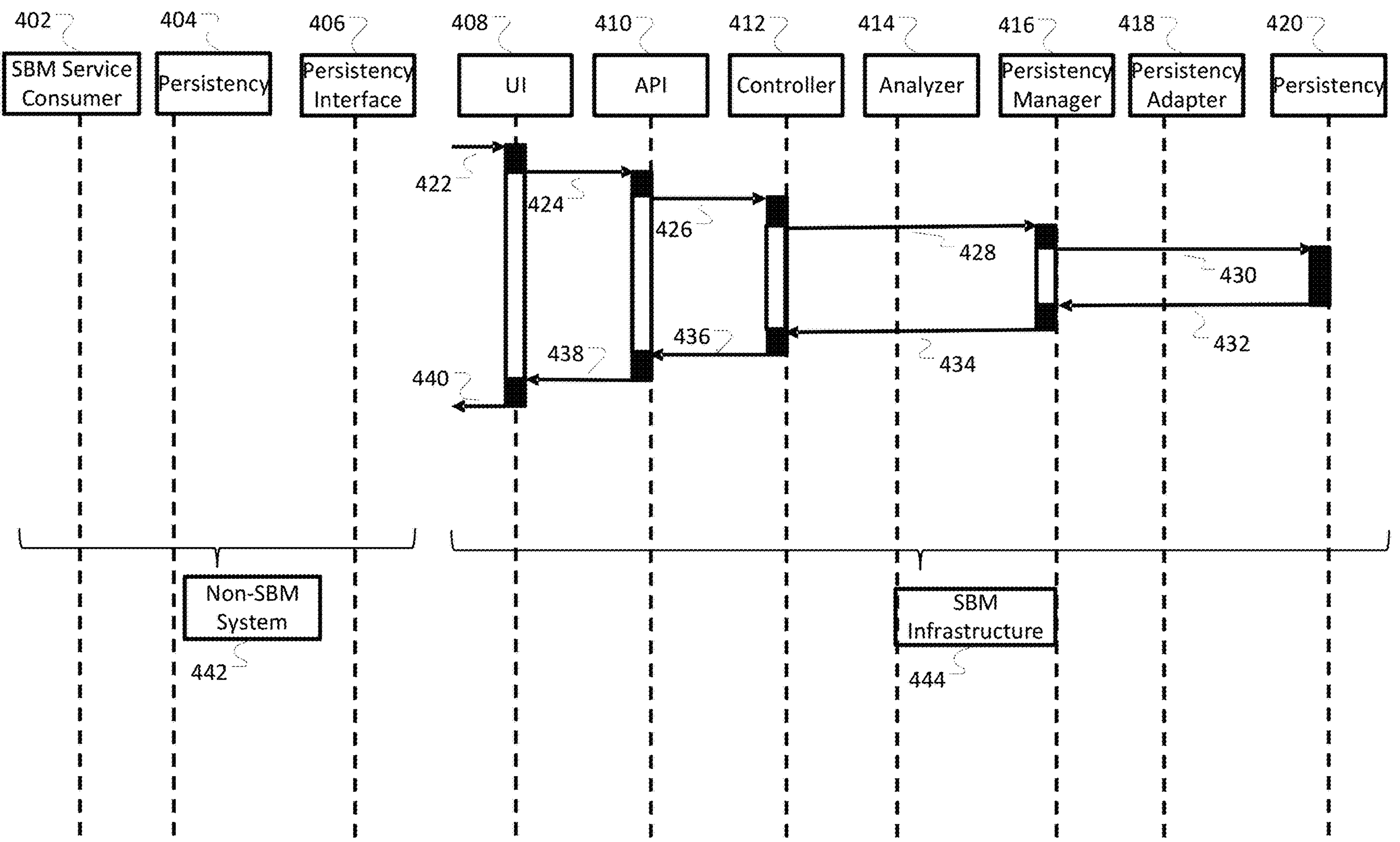
FIG. 4 is a flowchart illustrating an example of a process for displaying, inserting, updating, or deleting SBM data, in accordance with example implementations of this specification.

FIG. 4 illustrates an example of a process for displaying, inserting, updating, or deleting SBM data, in accordance with implementations of this specification. As illustrated, a non-SBM system 442 may include an SMB service consumer 402, a persistency 404, and a persistency interface 406. The SBM infrastructure 444 may include, for example, UI 408, API 410, controller 412, analyzer 414, persistency manager 416, persistency adapter 418, and persistency 420. Additionally, as illustrated in FIG. 1, in some implementations, the non-SBM system 442 can remotely access SBM-based functionalities provided by the SBM infrastructure 444 through the network 106 in FIG. 1. The SBM data is stored locally in persistency 420 of the SBM infrastructure 444, and the process for displaying, inserting, updating, or deleting the locally stored SBM data in the illustrated example is initiated by a request from a user interacting with UI 408 at 422. In other implementations it could also be initiated from the SBM service consumer 402.

A use case associated with FIG. 4 can be a user requests to look up SBM terms maintained in SBM infrastructure 444. In this case, the user can open a UI application on UI 408 that allows the user to enter fuzzy search strings such as "Prod*" and/or other predefined selection criteria such as the language associated with the entered fuzzy search strings. Next, the user can press a search button and the corresponding request can be routed through the SBM infrastructure 444 that selects the matching terms from the SBM data stored in persistency 420. The selected matching terms are then returned to the user and displayed as a list in the UI application on UI 408.

The detailed steps of the example process illustrated in FIG. 4 are described below.

At 422, a user interacts with UI 408 to request displaying, inserting, updating, or deleting SBM data stored in persistency 420 in SBM infrastructure 444. At 424, UI 408 sends the service request to API 410, which supports the user's access to functionalities provided by SBM infrastructure 444. Among other things, the request specifies the entered search term "Prod" as well as the columns that shall be populated in the list of the UI application. At 426, API 410 sends a request to controller 412 for orchestrating processing associated with the service request. The API 410 also translates the service request to the internal processing format of the SBM infrastructure. For example, if the UI application was based upon a single OData entity, which exposes data originating from various SBM data sources, the service request would be mapped onto the corresponding SBM entities like the SBM entity for terms. The mapping result could be represented as a JSON object.

At 428, controller 412 sends an access request to persistency manager 416 for accessing the SBM data stored in persistency 420. At 430, the persistency manager 416 sends an access request to persistency 420 to access the SBM data. It transforms the controller request into a single or multiple suitable SQL select statements on the SBM data tables such as the data base table that stores the term information.

At 432, persistency 420 sends the result(s) of the SQL data selection(s) to persistency manager 416. At 434, persistency manager 416 converts the SQL data received from persistency 420 to the SBM internal format and sends this data to controller 412. At 436, controller 412 maps the received SBM information to its service request and sends it to API 410. At 438, API 410 maps the SBM information to its service format and sends the processed SBM data to UI 408. At 440, UI 408 interacts with the user to show the processed SBM data to the user.

FIGS. 5-8 show exemplary ways of leveraging the SBM infrastructure for analyzing data and metadata. The depicted processes differ in the way the SBM functionality is triggered and used, as well as in the locality of the data and metadata to be analyzed, and are meant to be examples of various possible implementations.

Figure 5:
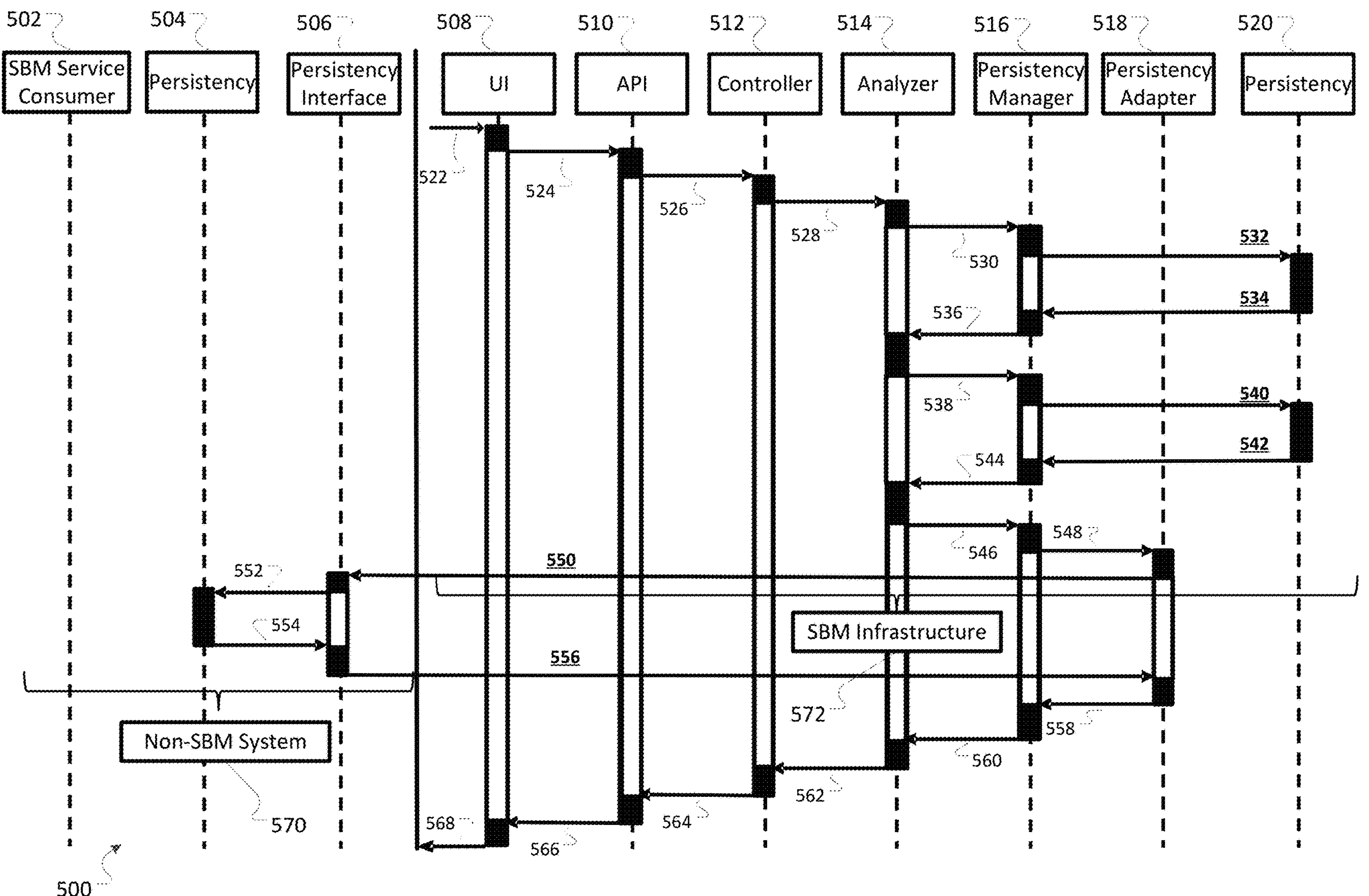
FIG. 5 is a flowchart illustrating an example of a process for analyzing local and remote data and metadata using an SBM infrastructure, in accordance with example implementations of this specification.

FIG. 5 illustrates an example of a process for analyzing local and remote data and metadata using SBM infrastructure, in accordance with implementations of this specification. As illustrated, a non-SBM system 570 may include an SMB service consumer 502, a persistency 504, and a persistency interface 506. The SBM infrastructure 572 may include, for example, UI 508, API 510, controller 512, analyzer 514, persistency manager 516, persistency adapter 518, and persistency 520. Additionally, as illustrated in FIG. 1, in some implementations, the non-SBM system 570 can remotely access SBM-based functionalities provided by the SBM infrastructure 572 through the network 106 in FIG. 1. The local data and metadata to be analyzed is stored locally in persistency 520 of the SBM infrastructure 572, the remote data and metadata to be analyzed is stored remotely in persistency 504 of the non-SBM system 570, and the process for analyzing the local and remote data and metadata using the SBM infrastructure 572 is initiated by a request from a user interacting with UI 508 at 522.

A use case associated with FIG. 5 can be a user requesting an analysis of business data stored locally in persistency 520 of the SBM infrastructure 572 as well as business data stored remotely in persistency 504 of the non-SBM system 570. For example, the user wants to search for Material 4711. The user enters the term "Material" and the value "4711" to be matched in the selection screen of UI 508 and starts running the analysis by pressing a corresponding button. The matching can be case-insensitive. The analyzer 514 in the SBM infrastructure 572 then determines that "Material" is a specialization of "Product" and includes the matching terms corresponding to "Product" into the analysis too. Furthermore, analyzer 514 also includes the abbreviations "Mat" and "Prod" as well as the spelling variations "MATERIAL", "PRODUCT", "MAT" and "PROD" into the search scope. Afterwards analyzer 514 starts analyzing the content of the business data stored locally in persistency 520. For example, analyzer 514 searches through the database repository to find table columns that match one of the previously determined terms like "PRODUCT" and looks up their data for values matching "4711". The corresponding records are then collected if a match in the database table is found. Similarly, business data in the non-SBM system 570 is also analyzed. Matches are added to the existing result list and returned to the UI application on UI 508 for displaying the matches.

The detailed steps of the example process illustrated in FIG. 5 are described below.

At 522, a user interacts with UI 508 to request analyzing local data and metadata stored in persistency 520 in SBM Infrastructure 572, as well as analyzing remote data and metadata stored in persistency 504 in the non-SBM system 570. Note that the analyzed information is typically stored in database tables, documents, files and alike, that are not specifically tailored for the usage by SBM. If suitable, implementations could also preprocess this original information by mapping terms using the SBM dictionary and storing the results in the SBM persistency. These preprocessed results may then subsequently be used instead of or in addition to the original information when performing concrete analyses making the latter become more efficient.

At 524, UI 508 sends the request to API 510 for accessing functionalities provided by SBM infrastructure 572. Such a request may look like the following:

```
https://.../sbm/uiapplication/search(term='Material',value='4711'
casesensitive=false)
```

At 526, API 510 converts the request to the SBM internal processing format which may be represented by the following JSON object:

```
{ "Search": [ { "Term": "Material", "Value": "4711","CaseSensitive":
false} ]
  "ResultSetDefinition": [ { "ColumnName": "TableName" },
      { "ColumnName": "SerializedKeyOfTableRecord" }
    ]
}
```

The object comprises the original search request accompanied by the information about which data shall be returned to the API service consumer. In this sample case the response shall define a list of matching table records identified by the table name and the key. This information is expected to be displayed later on in the UI application.

This adapted request is sent to controller 512 for orchestrating processing associated with the user request. At 528, controller 512 delegates the request to analyzer 514. The analyzer first starts determining the SBM information stored in persistency 520 that is needed for analyzing both the local data and the remote data that the user requested. For example, the user could have specified in the user request contextual information such as languages to consider, relevant terms, and admissible probability factors associated with matches. Based on this input at 530, analyzer 514 sends a request to persistency manager 516 for retrieving related terms and their probability factors etc. primarily from the SBM dictionary information stored in persistency 520.

In our sample scenario the request could look like follows:

{“Matches”:[{“Term”:“Material”,“CaseSensitive”: false}]}

At 532, persistency manager 516 converts this request for example into SQL selects and passes these statements to persistency 520. Such a select statement could look like follows:

```
SELECT term table~term
  FROM term_table
  WHERE UPPER(term_table~term) = UPPER('Material')
UNION SELECT specialization_table~term
  FROM specialization_table
  WHERE UPPER(specialization_table~specialized_term) =
  UPPER('Material')
UNION SELECT abbreviation_table~abbreviated_term AS term
  FROM abbreviation_table
    WHERE UPPER(abbreviation_table~term) = UPPER('Material')
      OR EXISTS ( SELECT *
        FROM specialization_table
        WHERE UPPER(specialization_table~specialized_term)
                = UPPER('Material')
          AND UPPER(specialization_table~term)
              = UPPER(abbreviation_table~term)
          )
```

This select statement searches case-insensitive for the term “Material” in the SBM table for terms “TERM_TABLE”. Additionally, it looks up associated generalizations stored in the SBM table “SPECIALIZATION_TABLE”. Last but not least, it also includes abbreviations of the terms from SBM table “ABBREVIATION_TABLE”. The selection result may look like follows:

| TERM |
| --- |
| Material |
| Product |
| Mat |
| Prod |
| MATERIAL |
| PRODUCT |
| MAT |
| PROD |

At 534, persistency 520 sends this selection result to persistency manager 516 of the SBM infrastructure 572. At 536, persistency manager 516 constructs a response in the SBM internal processing format from this selection result. The converted selection result may look like follows:

```
{"Matches": [{Search: [{"Term":"Material","CaseSensitive":false}],
  "Results:[{"Term":"Material"},
    {"Term":"Product"},
    {"Term":"Mat"},
    {"Term":"Prod"},
    {"Term" "MATERIAL"},
    {"Term":"PRODUCT"},
    {"Term":"MAT"},
    {"Term":"PROD"} ]}]}
```

The persistency manager sends this response to analyzer 514.

The analyzer 514 then adjusts the original user request by evaluating the information captured in the response. In our example, it will not only search for matches for the entered term “Material” itself, but also for associated terms like “Product”, “Prod”, etc., as mentioned before.

At 538, analyzer 514 first identifies the relevant data sources by evaluating the information of the repository, and then sends requests to persistency manager 516 for accessing the local data and metadata stored in persistency 520 that the user requested for analysis. If no analysis scope was defined by the user, all data sources are evaluated by default. If multiple relevant data sources were found, then they are typically processed one after the other, although concurrent processing may also be used. At 540, persistency manager 516 converts these individual requests to SQL select statements and sends them to persistency 520 to request access to the local data and metadata.

At 542, persistency 520 sends the local data and metadata to persistency manager 516. At 544, persistency manager 516 maps the selection result to the SBM internal processing format and sends it to analyzer 514, which collects the matching local data and metadata.

On a more detailed level, at 538, the analyzer will first select all database tables which contain a column with a name that matches one of the previously matched terms such as “Material” or “Product” or “Mat” or alike. Besides the names of the matching tables and their columns it will also select the key fields of these tables. The result may look like follows:

```
{ "Matches": [{...Results:
  { "LocalTables": [ { "TableName": "PRODUCT_TABLE",
      "FieldName": "PRODUCT",
      "KeyOfTableRecord": [ { "FieldName" : "PRODUCT"} ]
    },
    { "TableName": "PURCHASE_ORDER_ITEM_TABLE",
      "FieldName": "MAT",
      "KeyOfTableRecord": [ { "FieldName" : "PURCHASE_ORDER"},
        { "FieldName" : "PURCHASE_ORDER_ITEM"} ]
    },
    { "TableName": "SALES_ORDER_ITEM_TABLE",
      "FieldName": "MATERIAL",
      "KeyOfTableRecord": [ { "FieldName" : "SALES_ORDER"},
        { "FieldName" : "SALES_ORDER_ITEM"} ]
    }]
}}]}
```

For example, there is a match for “PRODUCT” found in the columns of the product master table “PRODUCT_TABLE”, a match for “MAT” found in the columns of the purchase order item table “PURCHASE_ORDER_ITEM_TABLE” and a match for “MATERIAL” found in the columns of the sales order item table “SALES_ORDER_ITEM_TABLE”. Based on this information, in a subsequent step the analyzer tries to match the content of the previously identified table columns with the value “4711” entered by the user. In this context, it may instruct the persistency manager to perform select statements such as:

```
SELECT PURCHASE_ORDER_ITEM_TABLE~PURCHASE_ORDER,
  PURCHASE_ORDER_ITEM_TABLE~
    PURCHASE_ORDER_ITEM,
FROM PURCHASE_ORDER_ITEM_TABLE
WHERE
  PURCHASE_ORDER_ITEM_TABLE~MAT='4711'
```

which returns the key field values of the purchase order records that refer to Material 4711.

The selection results are then converted and collected for example in a JSON object like:

```
{ "Matches": [{...Results:
    { "LocalTables": [ { "TableName": "PRODUCT_TABLE",
      "FieldName": "PRODUCT",
      "FieldValue": "4711",
      "KeyOfTableRecord": [ { "FieldName" : "PRODUCT",
          "FieldValue": "4711" } ]
    },
    { "TableName": "PURCHASE_ORDER_ITEM_TABLE",
      "FieldName": "MAT",
      "FieldValue": "4711",
```

-continued

```
      "KeyOfTableRecord": [ { "FieldName" : "PURCHASE_ORDER"
          "FieldValue": "6899"},
        { "FieldName" : "PURCHASE_ORDER_ITEM",
          "FieldValue": "10" } ]
    },
    { "TableName": "SALES_ORDER_ITEM_TABLE",
      "FieldName": "MATERIAL",
      "FieldValue": "4711",
      "KeyOfTableRecord": [ { "FieldName" : "SALES_ORDER",
          "FieldValue": "398"},
        { "FieldName" : "SALES_ORDER_ITEM",
          "FieldValue": "10" } ]
    }]
}}]}
```

At 546, analyzer 514 sends corresponding requests to persistency manager 516 for accessing the remote data and metadata stored in persistency 504 of non-SBM System 570 that the user requested for analysis. At 548, persistency manager 516 delegates the request to persistency adapter 518 to request access to the remote data and metadata. The persistency adapter 518 converts the request from its SBM internal format to the format of the persistency interface 506 to be connected. For example, if the persistency interface supports OData protocol the request will be translated accordingly.

At 550, persistency adapter 518 sends a message to persistency interface 506 in non-SBM system 570 to request access of the remote data and metadata stored in persistency 504 of non-SBM system 570. At 552, persistency interface 506 sends a request for accessing the remote data and metadata to persistency 504.

At 554, persistency 504 sends the requested remote data and metadata to persistency interface 506. At 556, persistency interface 506 sends the remote data and metadata to persistency adapter 518 in SBM infrastructure 572. The persistency adapter 518 converts the received information to the SBM internal processing format.

At 558, persistency 520 sends the remote data and metadata to persistency manager 516. At 560, persistency manager 516 sends the remote data and metadata to analyzer 514, which adds the matching results to the already collected results.

At 562, analyzer 514 sends the analysis results of the local and remote data and metadata to controller 512, after further analyzing both the local and the remote data and metadata using the SBM information received at 536. For example, probability factors could be evaluated to rank the results. Besides, the analysis results are adapted according to the original request of the API 510 at 526. The adaption result could look like follows:

```
{ "Matches": [{"Search":[{ "Term":"Material","Value": "4711",
"CaseSensitive":false}],
  "Results": [ { "TableName":"PRODUCT_TABLE",
      "SerializedKeyOfTableRecord":"4711" },
    { "TableName": "PURCHASE_ORDER_ITEM_TABLE",
      "SerializedKeyOfTableRecord":"6899-10" },
    { "TableName":"SALES_ORDER_ITEM_TABLE",
      "SerializedKeyOfTableRecord":"398-10" }]
}]}
```

It contains a list of matching table records with their identifications.

At 564, controller 512 sends the received analysis results to API 510. At 566, API 510 converts and sends the received analysis results to UI 508. At 568, UI 508 interacts with the user to show the received analysis results to the user.

Figure 6:
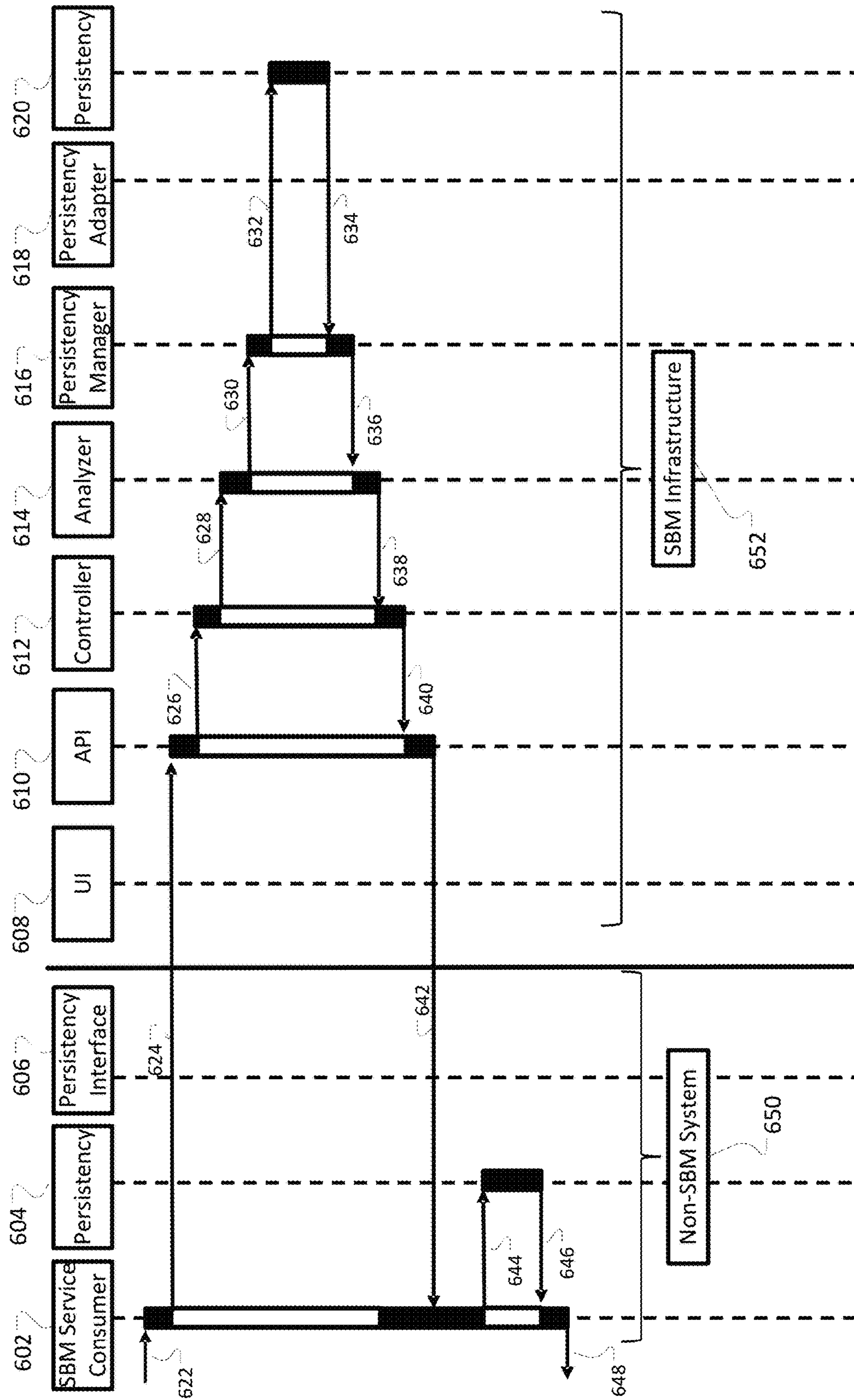
FIG. 6 is a flowchart illustrating an example of a process for analyzing local and remote data and metadata using an SBM infrastructure, in accordance with example implementations of this specification.

FIG. 6 illustrates an example of a process for analyzing external data and metadata using an SBM infrastructure 652, in accordance with an implementation of this solution. Compared to FIG. 5, the process is controlled from outside the SBM infrastructure. Furthermore, within the process the SBM infrastructure is only used for providing matching terms and alike, whereas the actual analysis of data and metadata is performed by the SBM consumer himself. The external data and metadata are stored in persistency 604 of non-SBM system 650. As illustrated, a non-SBM system 650 may include an SMB service consumer 602, a persistency 604, and a persistency interface 606. The SBM infrastructure 652 may include, for example, UI 608, API 610, controller 612, analyzer 614, persistency manager 616, persistency adapter 618, and persistency 620. Additionally, as illustrated in FIG. 1, in some implementations, the non-SBM system 650 can remotely access SBM-based functionalities provided by the SBM infrastructure 652 through the network 106 in FIG. 1. The external data and metadata to be analyzed is stored remotely in persistency 604 of the non-SBM system 650, the SBM information to be used to analyze the external data and metadata is stored locally in persistency 620 of the SBM infrastructure 652, and the process for analyzing the external data and metadata using the SBM infrastructure 652 is initiated by a request from a user interacting with SBM service consumer 602 at 622. The SBM functionality provided by the SBM infrastructure 652 can be called programmatically by the non-SBM system 650.

The detailed steps of the example process illustrated in FIG. 6 are described below.

At 622, a user interacts with SBM service consumer 602 to request analysis of external data and metadata stored in persistency 604 of the non-SBM system 650. At 624, SBM service consumer 602 sends the request to API 610 for accessing functionalities provided by SBM infrastructure 652. At 626, API 610 sends a request to controller 612 for orchestrating processing associated with the user request. At 628, controller 612 asks analyzer 614 to determine SBM information stored in persistency 620 that is needed for analyzing the data and metadata that the user requested. This data primarily originates in the SBM dictionary such as matching terms. At 630, analyzer 614 sends a request to persistency manager 616 for accessing the SBM information stored in persistency 620, after analyzer 614 determines the SBM information needed for analyzing the data and metadata, based on the user request. At 632, persistency manager 616 sends a request to persistency 620 to request access to the SBM information determined by analyzer 614.

At 634, persistency 620 sends the requested SBM information to persistency manager 616. At 636, persistency manager 616 sends the SBM information to analyzer 614. At 638, analyzer 614 sends the received SBM information to controller 612. At 640, controller 612 sends the received SBM information to API 610. At 642, API 610 sends the received SBM information to SBM service consumer 602. The service consumer evaluates the user request interpreting the received SBM information.

At 644, SBM service consumer 602 sends a request to persistency 604 to access the data and metadata that the user requested for analysis. At 646, persistency 604 sends the requested data and metadata to SBM service consumer 602. At 648, SBM service consumer 602 sends the analysis results to the user, after analyzing the data and metadata received at 646, using the SBM information received at 642.

Figure 7:
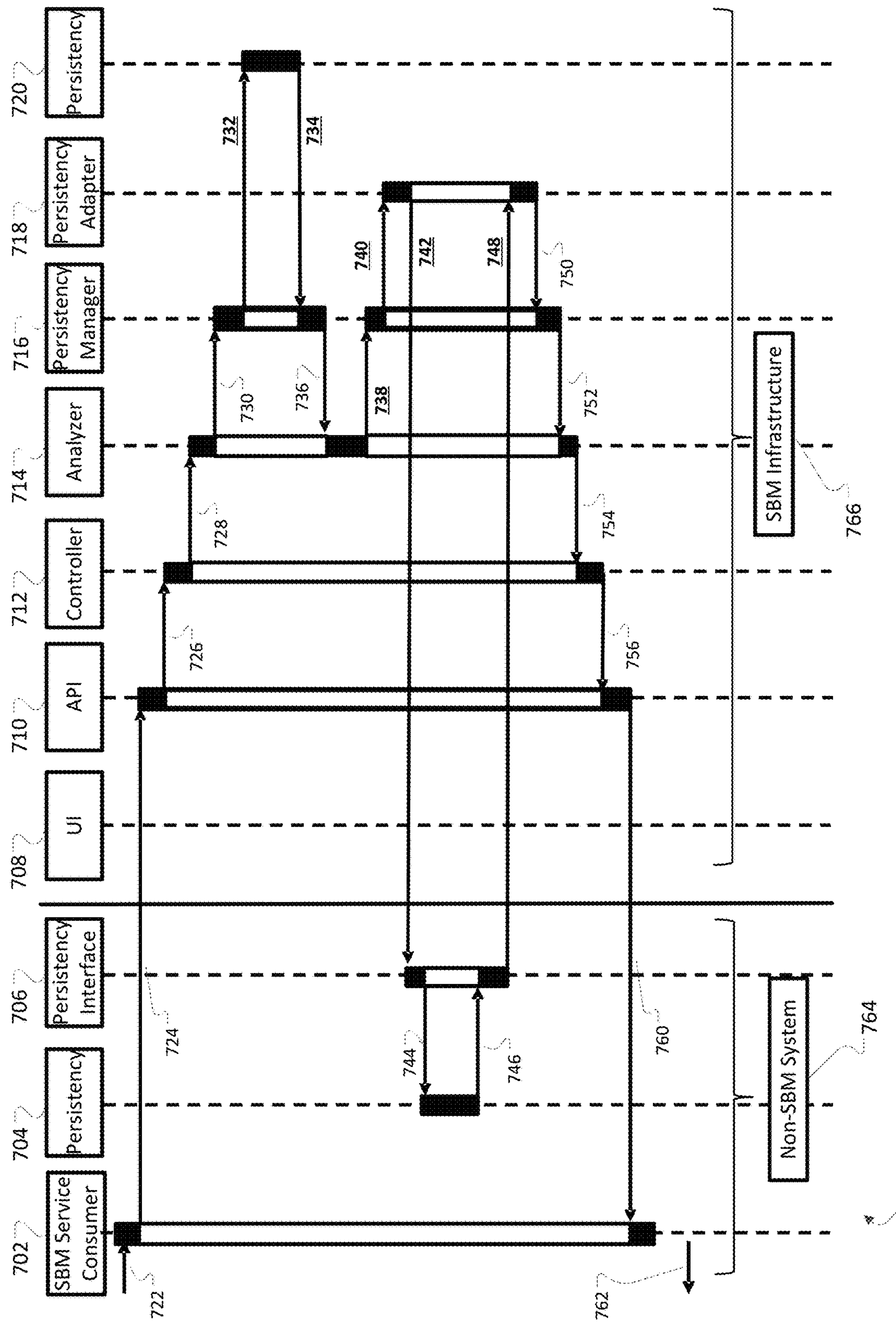
FIG. 7 is a flowchart illustrating an example of a process for analyzing local and remote data and metadata using an SBM infrastructure, in accordance with example implementations of this specification.

FIG. 7 illustrates an example of a process for analyzing external data and metadata using SBM infrastructure, that is, data and metadata stored remotely outside the SBM infrastructure, in accordance with implementations of this specification. Compared to FIG. 6, the entire analysis process is performed within the SBM infrastructure. The external data and metadata are stored in persistency 704 of non-SBM system 764. As illustrated, a non-SBM system 764 may include an SMB service consumer 702, a persistency 704, and a persistency interface 706. The SBM infrastructure 766 may include, for example, UI 708, API 710, controller 712, analyzer 714, persistency manager 716, persistency adapter 718, and persistency 720. Additionally, as illustrated in FIG. 1, in some implementations, the non-SBM system 764 can remotely access SBM-based functionalities provided by the SBM infrastructure 766 through the network 106 in FIG. 1. The external data and metadata to be analyzed is stored remotely in persistency 704 of the non-SBM system 764 and fetched through persistency interface 706 of the non-SBM system 764 and persistency adaptor 718 of the SBM infrastructure 766, the SBM information to be used to analyze the external data and metadata is stored locally in persistency 720 of the SBM infrastructure 766, and the process for analyzing the external data and metadata using the SBM infrastructure 766 is initiated by a request from a user interacting with SBM Service Consumer 702 at 722. The SBM functionality provided by the SBM infrastructure 766 can be called programmatically by the non-SBM system 764.

The detailed steps of the example process illustrated in FIG. 7 are described below.

At 722, a user interacts with SBM service consumer 702 to request analysis of data and metadata stored in persistency 704 in non-SBM System 764. At 724, SBM service consumer 702 sends the request to API 710 for accessing functionalities provided by SBM infrastructure 766. At 726, API 710 sends a message to controller 712 for orchestrating processing associated with the user request. At 728, controller 712 asks analyzer 714 to determine SBM information stored in persistency 720 that is needed for analyzing the data and metadata that the user requested. At 730, analyzer 714 sends a request to persistency manager 716 for accessing the SBM information stored in persistency 720, after analyzer 714 determines the SBM information needed for analyzing the data and metadata, based on the user request. At 732, persistency manager 716 sends a request to persistency 720 to request access to the SBM information determined by analyzer 714.

At 734, persistency 720 sends the SBM information to persistency manager 716. At 736, persistency manager 716 sends the SBM information to analyzer 714.

At 738, analyzer 714 sends a message to persistency manager 716 to request access to data and metadata the user requested to analyze that are stored in persistency 704 of non-SBM system 764. At 740, persistency manager 716 sends a request to persistency adapter 718 to request access to the data and metadata stored in persistency 704 of non-SBM System 764.

At 742, persistency adapter 718 sends a request to persistency interface 706 in non-SBM system 764 for accessing the data and metadata stored in persistency 704 of non-SBM system 764. At 744, persistency interface 706 sends a message to persistency 704 to access the data and metadata stored in persistency 704.

At 746, persistency 704 sends the data and metadata requested to persistency interface 706. At 748, persistency interface 706 sends the data and metadata to persistency adapter 718.

At 750, persistency adapter 718 sends the data and metadata to persistency manager 716. At 752, persistency manager 716 sends the data and metadata to analyzer 714 for analysis using SBM information received at 736. At 754, analyzer 714 sends the analysis results to controller 712 after analyzing the data and metadata received at 752 using SBM information received at 736. At 756, controller 712 sends the analysis results to API 710. At 760, API 710 sends the analysis results to SBM service consumer 702. At 762, SBM service consumer 702 sends the analysis results to the user.

Figure 8:
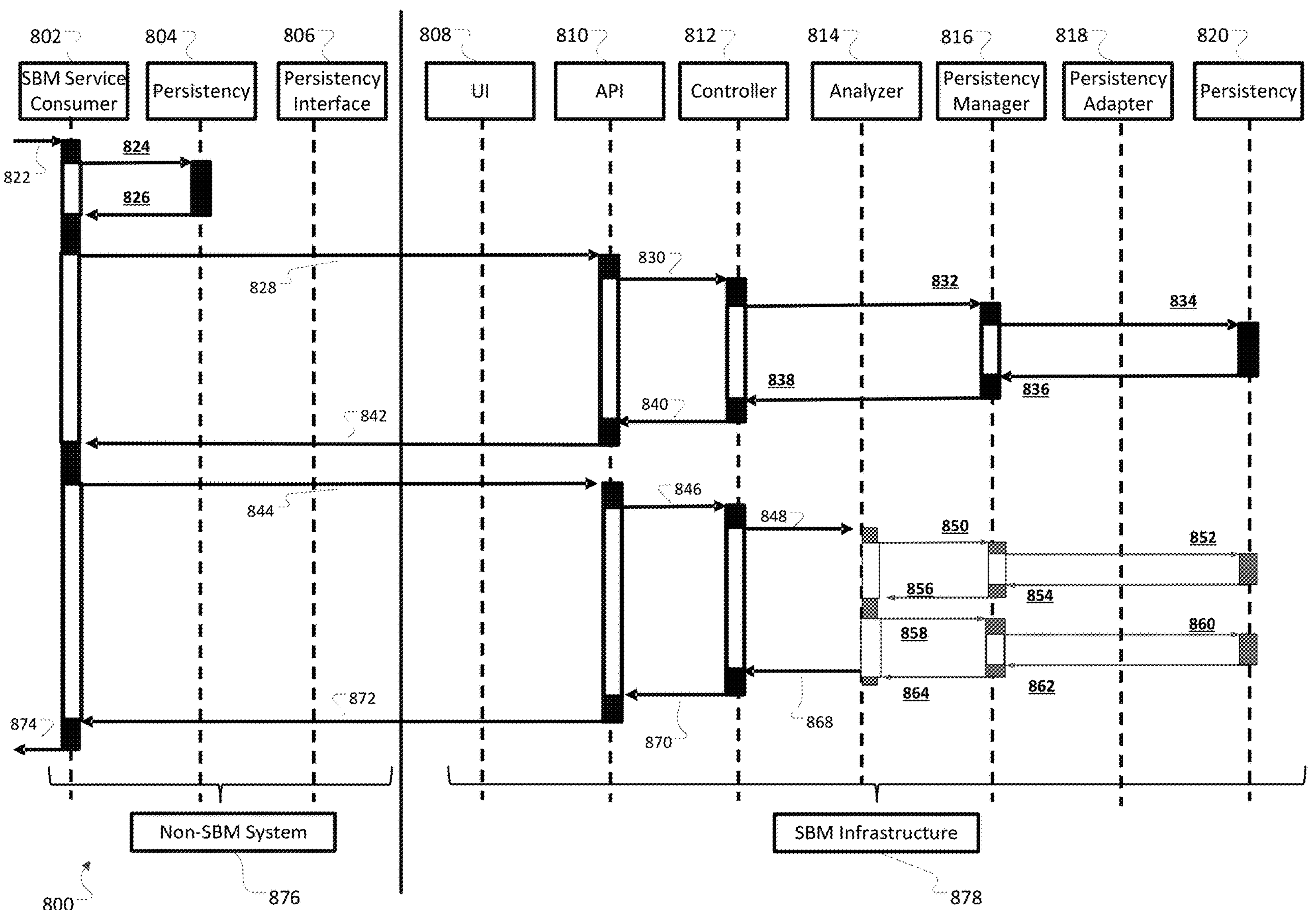
FIG. 8 is a flowchart illustrating an example of a process for analyzing local and remote data and metadata using an SBM infrastructure, in accordance with example implementations of this specification.

FIG. 8 illustrates an example of a process for analyzing external data and metadata using SBM infrastructure, in accordance with implementations of this specification. Compared to FIG. 7, the external data and metadata is first replicated to the SBM infrastructure. Afterwards, the analysis is performed on local data and metadata of the SBM infrastructure. The external data and metadata are stored in persistency 804 of non-SBM System 876. As illustrated, a non-SBM system 876 may include an SBM service consumer 802, a persistency 804, and a persistency interface 806. The SBM infrastructure 878 may include, for example, UI 808, API 810, controller 812, analyzer 814, persistency manager 816, persistency adapter 818, and persistency 820. Additionally, as illustrated in FIG. 1, in some implementations, the non-SBM system 876 can remotely access SBM-based functionalities provided by the SBM infrastructure 878 through the network 106 in FIG. 1. The external data and metadata to be analyzed is first stored remotely in persistency 804 of the non-SBM system 876 and then replicated to persistency 820 of the SBM infrastructure 878, before being fetched from persistency 820 for analysis. The SBM information to be used to analyze the external data and metadata is stored locally in persistency 820 of the SBM infrastructure 878, and the process for analyzing the external data and metadata using the SBM infrastructure 878 is initiated by a request from a user interacting with SBM Service Consumer 802 at 822. The SBM functionality provided by the SBM infrastructure 878 is called programmatically by the non-SBM system 876.

At 822, a user interacts with SBM service consumer 802 to request analysis of data and metadata stored in persistency 804 in non-SBM system 876. At 824, SBM service consumer 802 sends a request to persistency 804 to request access to the data and metadata to be analyzed. At 826, persistency 804 sends the requested data and metadata to SBM service consumer 802.

At 828, SBM service consumer 802 sends the data and metadata received at 826 to API 810. At 830, API 810 sends the data and metadata to controller 812. At 832, controller 812 sends the data and metadata to persistency manager 816 that has access to persistency 820. At 834, persistency manager 816 sends the data and metadata to persistency 820 for the data and metadata to be stored in persistency 820.

At 836, persistency 820 sends a request to persistency manager 816 indicating the data and metadata have been stored to persistency 820. At 838, persistency manager 816 sends a response to controller 812 indicating the data and metadata have been stored successfully to persistency 820. At 840, controller 812 sends a response to API 810 indicating the data and metadata have been stored to persistency 820. At 842, API 810 sends a response to SBM service consumer 802 indicating the data and metadata have been stored to persistency 820.

At 844, SBM service consumer 802 sends a request to API 810 to perform an analysis of the data and metadata stored in persistency 820. At 846, API 810 sends a request to controller 812 to request analysis of the data and metadata. At 848, controller 812 sends a request to analyzer 814 to request analysis of the data and metadata by the analyzer 814. At 850, the analyzer 814 sends a request to persistency manager 816 to request access to SBM information needed for the analysis. At 852, the persistency manager 816 passes the request to persistency 820. At 854, persistency 820 sends the result to persistency manager 816. At 856, persistency manager 816 sends the result to analyzer 814. At 858, analyzer 814 sends requests to persistency manager 816 for accessing the data and metadata stored in persistency 820 that the user requested for analysis. At 860, persistency manager 816 converts these requests for example to SQL select statements and sends them to persistency 820 to request access to the data and metadata.

At 862, persistency 820 sends the requested SBM information and the data and metadata to persistency manager 816. At 864, persistency manager 816 sends the requested SBM information and the data and metadata to analyzer 814 for analysis of the data and metadata using the SBM information. At 868, analyzer 814 sends the analysis results to controller 812, after analyzing the data and metadata using the SBM information. At 870, controller 812 sends the analysis results to API 810. At 872, API 810 sends the analysis results to SBM service consumer 802. At 874, SBM service consumer 802 sends the analysis results to the user.

Figure 9:
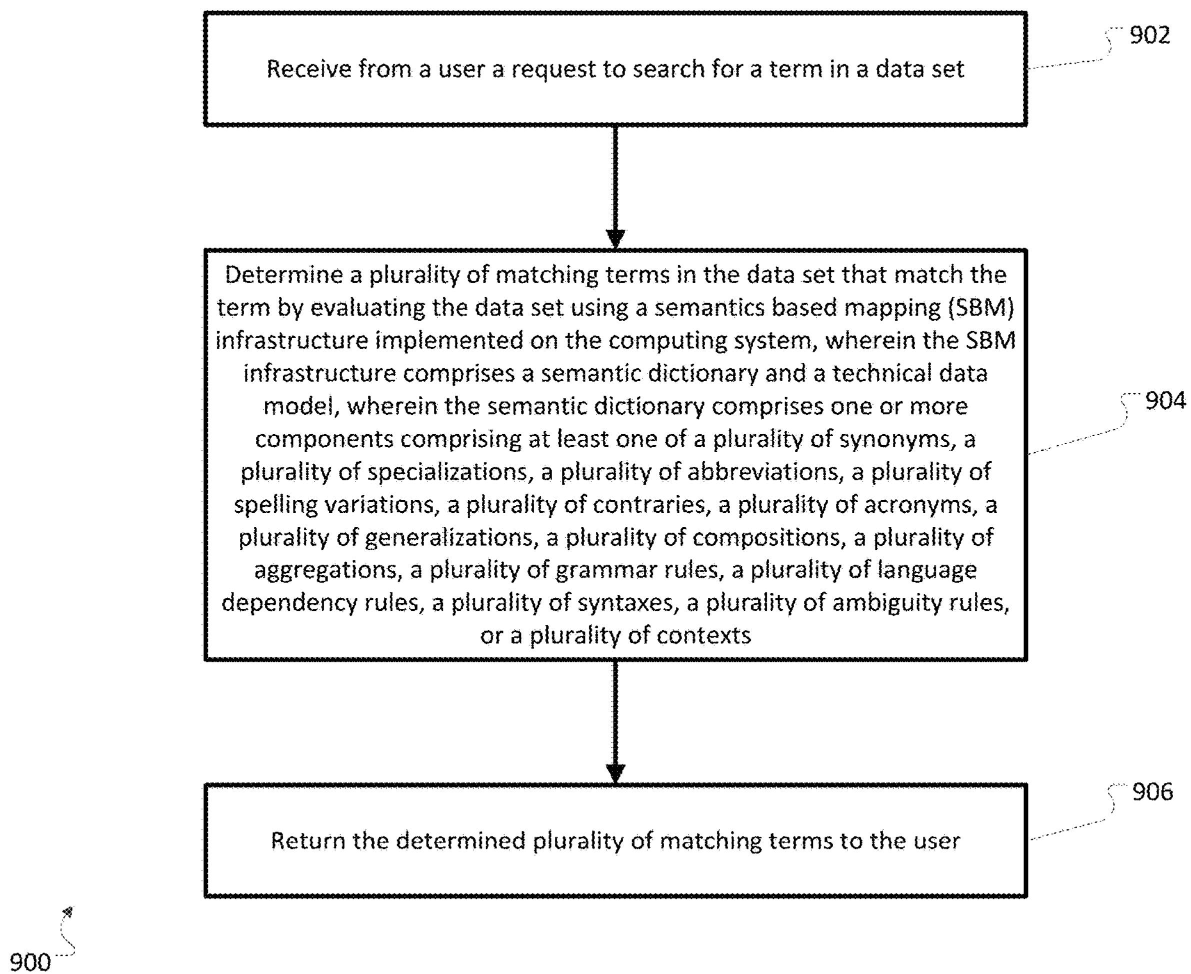
FIG. 9 is a flowchart illustrating an example of a method for searching for a term in a data set by correlating semantically connected data and metadata in the data set using an SBM infrastructure, in accordance with example implementations of this specification.

FIG. 9 illustrates an example of a method for searching for a term in a data set by correlating semantically connected data and metadata in the data set using SBM infrastructure, in accordance with implementations of this specification. It will be understood that method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some instances, the method 900 and related methods are executed by one or more components of the system 100 described above with respect to FIG. 1. For example, the method 900 and related methods can be executed by the SBM infrastructure 104 of FIG. 1.

At 902, a system receives from a user a request to search for a term in a data set. In some instances, the request can be associated with a search that can return a simple list of matching resources. For example, one can search for all analytical reports which provide insights into a given business KPI (key performance indicator). In some instances, the search may however also yield in a structured result list, such that the search results are displayed as table rows comprising predefined columns/information like identifiers, description texts, important characteristics and measures of the identified objects. In some instances, the search functionality can be executed programmatically, too. For example, the system can search for complaints of important customers using SBM and automatically send alerts to the support organization for taking care of the identified customers. As another example, the system can also be used for automatically deriving daily statistics such as the customer demand for a given product, etc.

At 904, the system determines a plurality of matching terms in the data set that match the term by evaluating the data set using a SBM infrastructure implemented on the server, where the SBM infrastructure comprises a semantic dictionary and a technical data model, and the semantic dictionary comprises one or more components comprising at least one of a plurality of synonyms, a plurality of specializations, a plurality of abbreviations, a plurality of spelling variations, a plurality of contraries, a plurality of acronyms, a plurality of generalizations, a plurality of compositions, a plurality of aggregations, a plurality of grammar rules, a plurality of language dependency rules, a plurality of syntaxes, a plurality of ambiguity rules, or a plurality of contexts.

At 906, the system returns the determined plurality of matching terms to the user.

Figure 10:
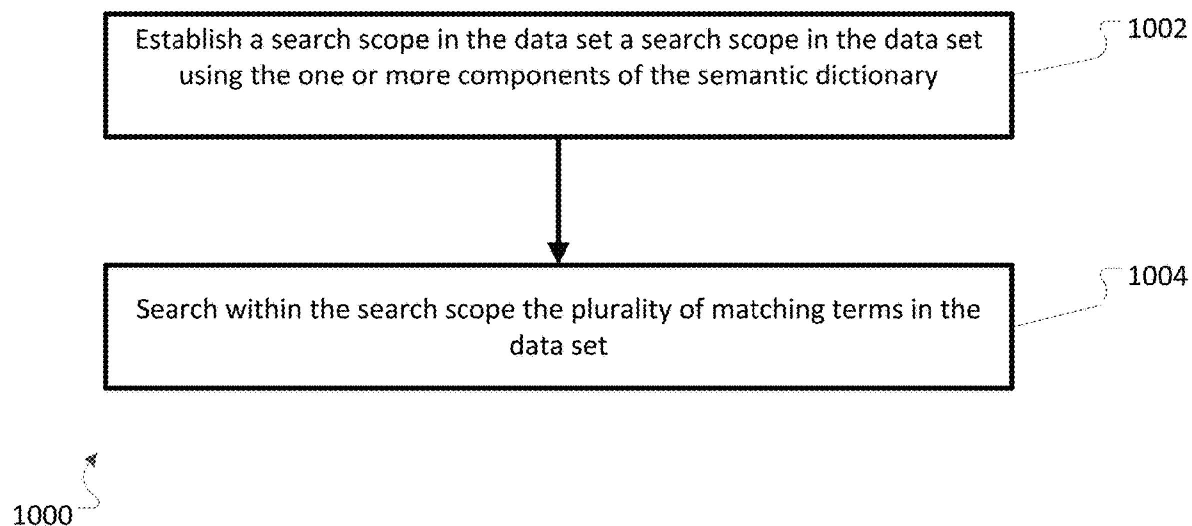
FIG. 10 is a flowchart illustrating an example of a method for evaluating a data set using SBM infrastructure, in accordance with example implementations of this specification.

FIG. 10 illustrates an example of a method for evaluating the data set at 904 described above using SBM infrastructure, in accordance with implementations of this specification. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the SBM infrastructure 104 of FIG. 1.

At 1002, the system establishes a search scope in the data set using the one or more components of the semantic dictionary.

At 1004, the system searches the plurality of matching terms within the search scope in the data set.

Figure 11:
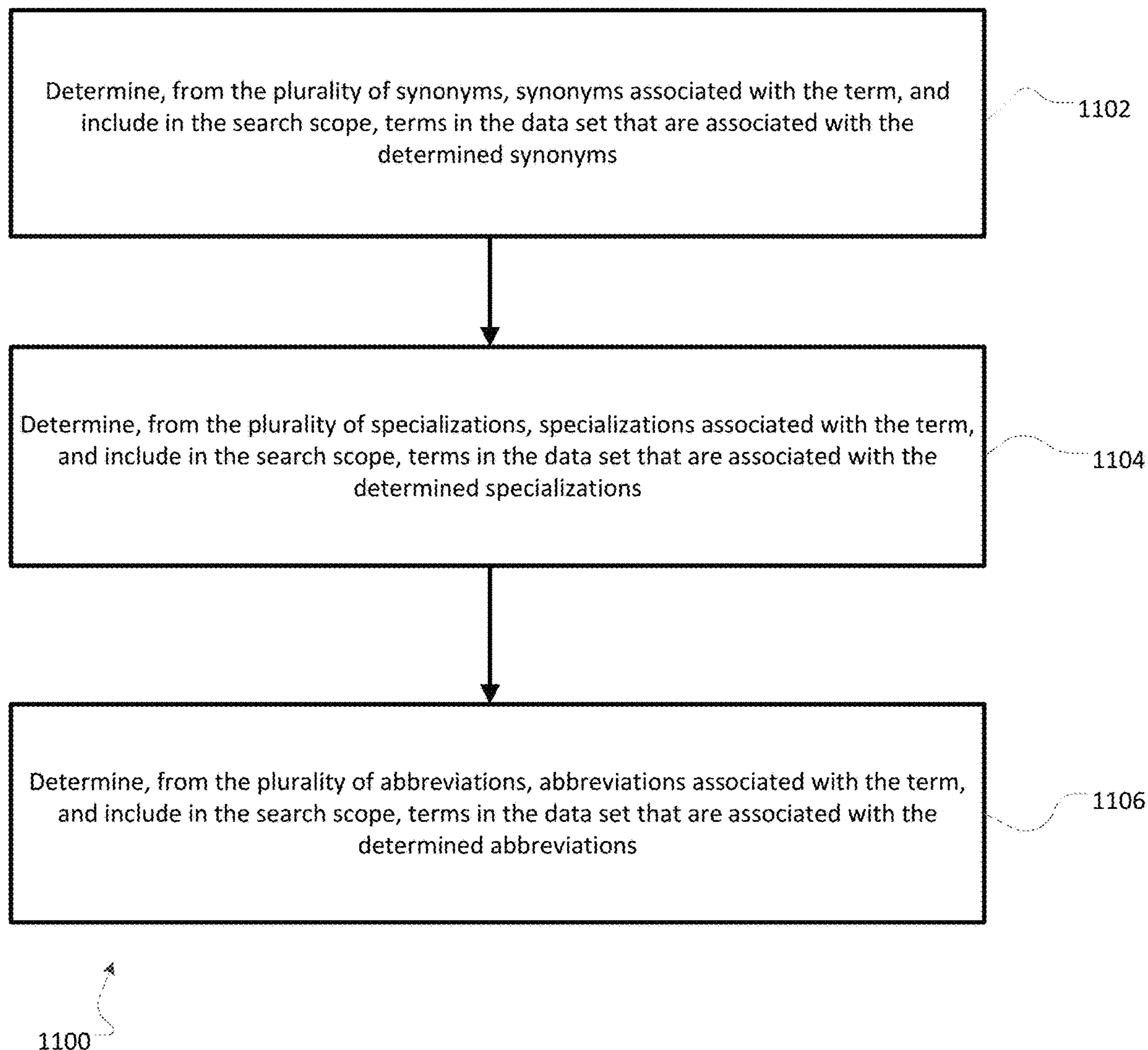
FIG. 11 is a flowchart illustrating an example of a method for establishing a search scope in a data set using an SBM infrastructure, in accordance with example implementations of this specification.

FIG. 11 illustrates an example of a method for establishing the search scope at 1002 described above using SBM infrastructure, in accordance with implementations of this specification. It will be understood that method 1100 and related methods may be performed, for example, by any suitable system, environment, software, and hardware, or a combination of systems, environments, software, and hardware, as appropriate. For example, one or more of a client, a server, or other computing device can be used to execute method 1100 and related methods and obtain any data from the memory of a client, the server, or the other computing device. In some implementations, the method 1100 and related methods are executed by one or more components of the system 100 described above with respect to FIG. 1. For example, the method 1100 and related methods can be executed by the SBM infrastructure 104 of FIG. 1.

At 1102, the system determines, from the plurality of synonyms, synonyms associated with the term, if any, and includes, by the computing system and in the search scope, terms in the data set that are associated with the determined synonyms.

At 1104, the system determines, from the plurality of specializations, specializations associated with the term, if any, and includes, by the computing system and in the search scope, terms in the data set that are associated with the determined specializations.

At 1106, the system determines, from the plurality of abbreviations, abbreviations associated with the term, and includes, by the computing system and in the search scope, terms in the data set that are associated with the determined abbreviations.

Figure 12:
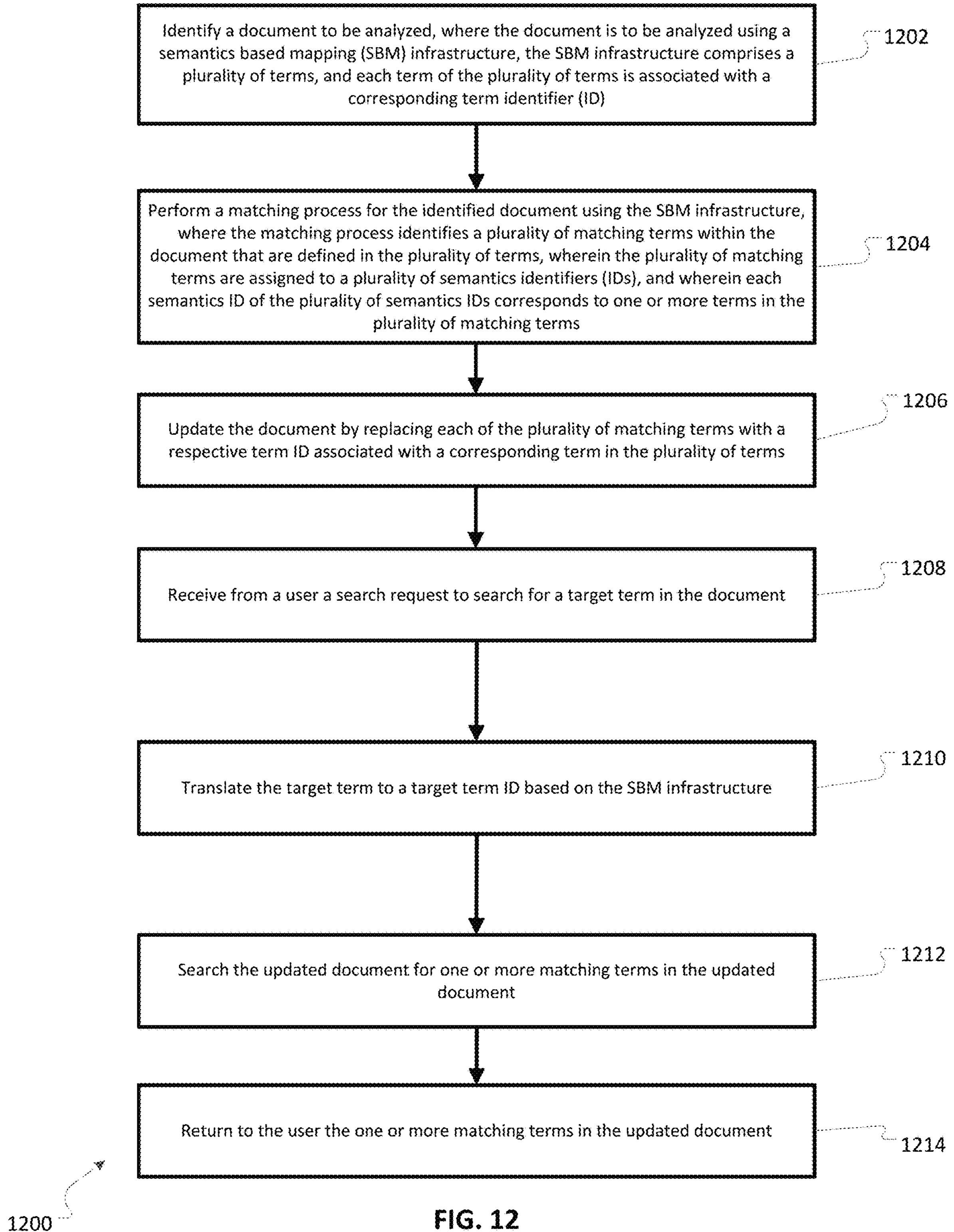
FIG. 12 is a flowchart illustrating an example of a method for searching for a term in a document by correlating semantically connected data and metadata in the document using an SBM infrastructure, in accordance with example implementations of this specification.

FIG. 12 illustrates an example of a method for searching for a term in a document by correlating semantically connected data and metadata in the document using SBM infrastructure, in accordance with implementations of this specification. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some instances, the method 1200 and related methods are executed by one or more components of the system 100 described above with respect to FIG. 1. For example, the method 1200 and related methods can be executed by the SBM infrastructure 104 of FIG. 1.

At 1202, a system identifies a document to be analyzed, where the document is to be analyzed using a semantics based mapping (SBM) infrastructure, the SBM infrastructure comprises a plurality of terms, where each term of the plurality of terms is associated with a corresponding term identifier (ID). In some instances, the documents to be analyzed can include newspaper articles, receipts, emails, books, files like Word documents, spreadsheets, PowerPoint presentations, database schema definitions, records stored in database tables, service oriented architecture (SOA) service definitions and message payloads, OData service metadata and request/response data, HTML pages, program code, spoken sentences in a phone call, and pictures containing textual information. In some instances, the document to be analyzed can be pre-processed. However, this preprocessing step is not necessarily required. As new terms are received over time, new unique term IDs can be assigned, and additional linking and semantic comparisons and relations can be defined, similar to the Tables presented previously.

At 1204, the system performs a matching process for the identified document using the SBM infrastructure, where the matching process identifies a plurality of matching terms within the document that are defined in the plurality of terms, wherein the plurality of matching terms are assigned to a plurality of semantics identifiers (IDs), and wherein each semantics ID of the plurality of semantics IDs corresponds to one or more terms in the plurality of matching terms. For example, terms with the same semantics abstraction of a concrete subject can be matched to that same subject that has a semantics ID. An example can be found in Tables 10-11 and the accompanying disclosure, where terms such as “sales order item”, “item of sales order”, “SalesOrderItem”, each having their own unique term ID, can all be assigned to the same semantics abstraction of the subject “sales order item” having a common semantics ID of “653”. This assignment of the three aforementioned terms to a subject “sales order item” with semantics ID “653” is part of the matching process. As another example, terms with different specializations can be matched to the same generalization term, as described in paragraphs describing illustrated Table 5, where the terms “customer” and “supplier” can both be assigned to the same generalization term “business partner”. This assignment is also part of the matching process.

At 1206, the system updates the document by replacing each of the plurality of matching terms with a respective term ID associated with a corresponding term in the plurality of terms. The replacement can generate a new or additional document with the corresponding term IDs, or the replacing may result in additional information being added into the original document. Still further, metadata associated with the document, or an indexed version of the document, can define the replacement equivalences of the respective term IDs. The adapted document may serve as a volatile/temporary intermediate analysis result and/or be persisted for subsequent analyses.

At 1208, the system receives a search request from a user to search for a target term in the document.

At 1210, the system translates the target term to a target term ID based on the SBM infrastructure.

At 1212, the system searches the updated document for one or more matching terms in the updated document. The search request at 1212 may occur immediately after, or significantly after (e.g., hours, days, weeks, months, etc.) the system has performed its analysis of the underlying document. In some cases, the target term ID is used to search directly for term IDs within the document that have been replaced with their corresponding term IDs, and/or their respective semantic IDs.

At 1214, the system returns to the user the one or more matching terms in the updated document.

The examples described below illustrate how the SBM infrastructure can be used for value matching. In this example, JSON document is used to capture the information to be analyzed, as shown below.

```
{"Products":[
  {"Product":"P1","ProductType":"T1",...},
  {"Product":"P2","ProductType":"T1",...},....
]},
{"BusinessPartners":[
  {"BusinessPartner":"BP1",...},
  {"BusinessPartner":"BP2",...},...
]},
{"SalesOrders":[
  {"SalesOrder":"SO1","SoldToParty":"BP1",...,"SalesOrderItems":[
  {"SalesOrderItem":"10","Material"="P1",...},
  {"SalesOrderItem":"20","Material"="P2",...},...]},...
]}
```

The following terms in Table 18 are defined in this example.

TABLE 18

| Term ID | Term |
|---|---|
| 301 | SalesOrders |
| 311 | SalesOrder |
| 312 | SalesOrderItems |
| 326 | SalesOrderItem |
| 452 | Material |
| 543 | BusinessPartners |
| 546 | BusinessPartner |
| 570 | Customer |
| 577 | SoldToParty |
| 899 | Product |
| 900 | Products |
| 912 | ProductType |

In order to enable fast evaluations at a later point in time one could identify and replace concrete terms by matching semantic dictionary aspects, thus creating a kind of index in a pre-processing step. The transformation result is shown below.

```
{"900":[
    {"899":"P1","912","T1",...},
  {"899":"P2","912","T1",...},...
]},
{"543":[
  {"546":"BP1",...},
  {"546":"BP2",...},...
]},
{"301":[
  {"311":"SO1","577":"BP1",...,"312":[
  {"326":"10","452"="P1",...},
  {"326":"20","452"="P2",...},...]},...
]}
```

A request to search for "Product" is sent to the SBM infrastructure, such as from a non-SBM system as illustrated in FIGS. 4-8. Such a request could first be mapped onto the corresponding term ID of "899". In a subsequent step, all specializations could be included into the analysis scope. In this example, "Material" (term "452") is a specialization of "Product". Similarly, the scope could be enhanced by further semantic mappings. For example, synonyms could be included into the mapping. Such mappings could be deeply nested, as well. The original search request can be enhanced in such a way that "BusinessPartner" corresponding to the term ID "546" will be included therein. Since "Customer" is a specialization of the "BusinessPartner", the term ID "570" will be included, too. And since "SoldToParty" is a specialization of "Customer", the term ID "577" will be included as well.

Once the terms in the mapping scope for the lookup were defined, subsequently they can be searched within the pre-processed JSON document. As shown below, correlations could for example be established by replacing specialized terms such 452 (Material) and 577 (SoldToParty) with their generalizations like 899 (Product) and 546 (BusinessPartner). These correlations can even be refined by applying a value-based mapping for the matched terms.

```
{"900":[
  {"899":"P1","912":"T1",...},
  {"899":"P2","912":"T1",...},...
]}
{"543":[
  {"546":"BP1",...},
  {"546":"BP2",...},...
]}
{"301":[
  {"311":"SO1","546":"BP1",...,"312":[
  {"326":"10","899"="P1",...},
  {"326":"20","899"="P2",...},...]},...
]}
```

Thus, one can determine that the products "P1" and "P2" listed under "900" and the business partner "BP1" listed under "543" are being referenced by the sales order "SO1" listed under "301".

In some implementations, whereas the pre-processing described above may support flexible evaluations, such a pre-processing is not necessarily required for using the SBM infrastructure. For example, if one is only interested in identifying "Product" information, one can map this request to the term "Material" via the semantic dictionary and directly search for related matches in the original JSON document.

Therefore, unlike foreign key relations defined in database tables, the matching logic in SBM is universally applicable, whereas foreign keys need to be defined individually per occurrence. Foreign key relations are not efficient and bears the risk of being incomplete and of introducing inconsistencies.

Whereas the example described above shows direct applications of the SBM-functionality, it is also possible to combine/integrate it with/into other analysis functions. For example, the plain SBM mapping could be combined with a fuzzy search option. In some implementations using a fuzziness threshold of "0.94" on a database would match "Products" and "ProductType" in the initial JSON document with the search term "Product". Though these matches have some correlation to "Product", they do not have the same meaning. In this context, the semantic information known by SBM could be used, for example, to identify "Products" as the plural/collection of "Product" and "ProductType" as a mere characteristic of "Product".

Note that the plain fuzzy search functionality itself is not able to map "Material" onto "Product" with sensible fuzziness thresholds. In order to match "Material" for the search term "Product" a fuzziness of "0.14" or less can to be applied in some implementations. This would however also include, for example, "Supplier", into the search result.

In some instances, instead of introducing such inaccuracies, the search could be enhanced by SBM to embed such alternative terms directly into the processing of regular search requests with sensible fuzziness thresholds and to filter and rank their results suitably.

In some instances, whereas the inclusion of specializations into the mapping scope semantically does not result in precision losses of the match results, the inclusion of generalizations could yield in inaccuracies. For example, a material is always a product, but a product is not always a material. As a result, when searching for "Material" and including "Product" as a generalization into the mapping scope, matches for the term "Product" reflect some uncertainty.

In some instances, the SBM term relations are not unidirectional, but are rather directed. By defining and evaluating contextual information, the likelihood of a precise mapping can be estimated and attached to the match for further refinements. Such a probability could, for example, be derived from the mere occurrences of the individual specializations. For example, if there is a 60 percent probability of the "Products" being "Materials" and 40 percent being "Service Products", the likelihood of a "Product" representing a "Material" could be estimated as 60 percent. However, in some instances, the probability could be estimated even more precisely by considering additional contextual information. For example, if within the sales order processing only "Material" is being used, "Product" could be used as a synonym for "Material" therein.

In some examples, additional metadata can be integrated into the SBM-based analyses. For example, one could identify database tables and OData entity sets of a given object by evaluating its technical key definition. If a key definition consists of a single field like "SalesOrder", it can be related to the "SalesOrder" object. However, if a key consists of multiple components like the two components "SalesOrder" and "SalesOrderItem", the entity could potentially be related to both the "SalesOrder" and the "SalesOrderItem". By leveraging the semantic knowledge of SBM ("SalesOrderItem" is a compositional child of "SalesOrder"), one can relate such a key to the entity "SalesOrderItem".

In some examples, the SBM infrastructure can be used for checking the consistency of the metadata models and the captured data. This can be illustrated by the following examples.

In one example, the business data is stored in a relational database table schema. Additionally, "Product" is typed as a character field with a maximum length of 40 characters. If a field "Material" with a maximum length of 50 characters is found, one can derive from the specialization relationship defined in SBM that such a typing is inconsistent, since "Material" values cannot be stored in the generalized "Product" fields. Either the "Product" field needs to be extended or the "Material" field has to be shortened according to its semantics.

Similarly, if a foreign key relation maps a source and a target field, one can check, via the SBM information, whether such a mapping is actually consistent both from technical perspective as well as from semantics perspective. For example, "ShipToParty" can be mapped onto "Customer". However, if "Supplier" is mapped onto "Customer", this leads to inconsistency, even though both are derived as specializations from "BusinessPartner". But, they themselves are no specialization of one another.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for semantic based data and metadata mapping, comprising:

identifying, by a computing system, a document to be analyzed, wherein the document is to be analyzed using a semantics based mapping (SBM) infrastructure, wherein the SBM infrastructure comprises a technical data model scoping a plurality of terms by assigning the plurality of terms to flexible contexts, wherein the technical data model comprises semantics identifiers (IDs), term IDs, and context IDs, and wherein each term of the plurality of terms is associated with a corresponding term identifier (ID) of the term IDs;

performing, by the computing system, a matching process for the document using the SBM infrastructure, wherein the matching process identifies a plurality of matching terms within the document that are defined in the plurality of terms, wherein the plurality of matching terms are assigned to the semantics IDs, wherein each semantics ID of the semantics IDs defines a semantic abstraction of a subject mapped to one or more terms in the plurality of matching terms depending on usage contexts, wherein the plurality of terms comprise at least one generalization term, wherein the plurality of matching terms comprise at least two unique specialization terms, and wherein a semantics ID of a generalization term in the plurality of terms corresponds to two or more unique specialization terms in the plurality of matching terms;

updating, by the computing system, the document by replacing each of the plurality of matching terms with the corresponding term ID of the term IDs associated with a corresponding term in the plurality of terms, to generate an updated document;

receiving, by the computing system, a search request to search for a target term in the document;

translating, by the computing system, the target term to a target term ID of the term IDs based on the SBM infrastructure;

searching, by the computing system, the updated document for one or more matching terms in the updated document; and returning, by the computing system, the one or more matching terms in the updated document.

2. The computer-implemented method according to claim 1, wherein each semantics ID of the semantics IDs corresponds to a respective subject, wherein the matching process comprises matching each semantics ID of the semantics IDs to one or more corresponding terms in the plurality of matching terms, and wherein the respective subject associated with each semantics ID is a semantics abstraction of the one or more corresponding terms in the plurality of matching terms.

3. The computer-implemented method according to claim 1, wherein the matching process comprises matching each context ID to one or more corresponding terms in the plurality of matching terms.

4. The computer-implemented method according to claim 3, wherein the subject is mapped to the context IDs that comprise at least one of a language context ID or an industry solution context ID.

5. The computer-implemented method according to claim 1, wherein the SBM infrastructure comprises a semantic dictionary, wherein the semantic dictionary comprises one or more components comprising at least one of a plurality of synonyms, a plurality of specializations, a plurality of abbreviations, a plurality of spelling variations, a plurality of contraries, a plurality of acronyms, a plurality of generalizations, a plurality of compositions, a plurality of aggregations, a plurality of grammar rules, a plurality of language dependency rules, a plurality of syntaxes, a plurality of ambiguity rules, a plurality of contexts, or a plurality of probability factors associated with the plurality of terms in the SBM infrastructure.

6. The computer-implemented method according to claim 5, wherein the plurality of grammar rules comprise rules for at least one of spelling, punctuation, declination, or conjugation.

7. The computer-implemented method according to claim 1, wherein the technical data model comprises a plurality of IDs for semantic abstraction of subjects in the document, wherein the plurality of IDs comprise a plurality of unique term IDs, wherein each of the term IDs of the term IDs is associated with a corresponding semantics ID and at least one context ID.

8. The computer-implemented method according to claim 1, wherein the plurality of matching terms in the document comprise a plurality of synonyms.

9. A non-transitory, computer-readable medium storing one or more instructions executable by a computer system to perform operations, the operations comprising:

identifying, by a computing system, a document to be analyzed, wherein the document is to be analyzed using a semantics based mapping (SBM) infrastructure, wherein the SBM infrastructure comprises a technical data model scoping a plurality of terms by assigning the plurality of terms to flexible contexts, wherein the technical data model comprises semantics identifiers (IDs), term IDs, and context IDs, and wherein each term of the plurality of terms is associated with a corresponding term identifier (ID) of the term IDs;

performing, by the computing system, a matching process for the document using the SBM infrastructure, wherein the matching process identifies a plurality of matching terms within the document that are defined in the plurality of terms, wherein the plurality of matching terms are assigned to the semantics IDs, wherein each semantics ID of the semantics IDs defines a semantic abstraction of a subject mapped to one or more terms in the plurality of matching terms depending on usage contexts, wherein the plurality of terms comprise at least one generalization term, wherein the plurality of matching terms comprise at least two unique specialization terms, and wherein a semantics ID of a generalization term in the plurality of terms corresponds to two or more unique specialization terms in the plurality of matching terms;

updating, by the computing system, the document by replacing each of the plurality of matching terms with the corresponding term ID of the term IDs associated with a corresponding term in the plurality of terms, to generate an updated document;

receiving, by the computing system, a search request to search for a target term in the document;

translating, by the computing system, the target term to a target term ID of the term IDs based on the SBM infrastructure;

searching, by the computing system, the updated document for one or more matching terms in the updated document; and returning, by the computing system, the one or more matching terms in the updated document.

10. The non-transitory, computer-readable medium according to claim 9, wherein each semantics ID of the semantics IDs corresponds to a respective subject, wherein the matching process comprises matching each semantics ID of the semantics IDs to one or more corresponding terms in the plurality of matching terms, and wherein the respective subject associated with each semantics ID is a semantics abstraction of the one or more corresponding terms in the plurality of matching terms.

11. The non-transitory, computer-readable medium according to claim 9, wherein the matching process comprises matching each context ID to one or more corresponding terms in the plurality of matching terms.

12. The non-transitory, computer-readable medium according to claim 11, wherein the subject is mapped to the context IDs that comprise at least one of a language context ID or an industry solution context ID.

13. The non-transitory, computer-readable medium according to claim 9, wherein the SBM infrastructure comprises a semantic dictionary, wherein the semantic dictionary comprises one or more components comprising at least one of a plurality of synonyms, a plurality of specializations, a plurality of abbreviations, a plurality of spelling variations, a plurality of contraries, a plurality of acronyms, a plurality of generalizations, a plurality of compositions, a plurality of aggregations, a plurality of grammar rules, a plurality of language dependency rules, a plurality of syntaxes, a plurality of ambiguity rules, a plurality of contexts, or a plurality of probability factors associated with the plurality of terms in the SBM infrastructure.

14. The non-transitory, computer-readable medium according to claim 13, wherein the plurality of grammar rules comprise rules for at least one of spelling, punctuation, declination, or conjugation.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, the one or more operations comprising:

identifying, by a computing system, a document to be analyzed, wherein the document is to be analyzed using a semantics based mapping (SBM) infrastructure, wherein the SBM infrastructure comprises a technical data model scoping a plurality of terms by assigning the plurality of terms to flexible contexts, wherein the technical data model comprises semantics identifiers (IDs), term IDs, and context IDs, and wherein each term of the plurality of terms is associated with a corresponding term identifier (ID) of the term IDs;

performing, by the computing system, a matching process for the document using the SBM infrastructure, wherein the matching process identifies a plurality of matching terms within the document that are defined in the plurality of terms, wherein the plurality of matching terms are assigned to the semantics IDs, wherein each semantics ID of the semantics IDs defines a semantic abstraction of a subject mapped to one or more terms in the plurality of matching terms depending on usage contexts, wherein the plurality of terms comprise at least one generalization term, wherein the plurality of matching terms comprise at least two unique specialization terms, and wherein a semantics ID of a generalization term in the plurality of terms corresponds to two or more unique specialization terms in the plurality of matching terms;

updating, by the computing system, the document by replacing each of the plurality of matching terms with the corresponding term ID of the term IDs associated with a corresponding term in the plurality of terms, to generate an updated document;

receiving, by the computing system, a search request to search for a target term in the document;

translating, by the computing system, the target term to a target term ID of the term IDs based on the SBM infrastructure;

searching, by the computing system, the updated document for one or more matching terms in the updated document; and returning, by the computing system, the one or more matching terms in the updated document.

16. The computer-implemented system according to claim 15, wherein each semantics ID of the semantics IDs corresponds to a respective subject, wherein the matching process comprises matching each semantics ID of the semantics IDs to one or more corresponding terms in the plurality of matching terms, and wherein the respective subject associated with each semantics ID is a semantics abstraction of the one or more corresponding terms in the plurality of matching terms.

17. The computer-implemented system according to claim 15, wherein the matching process comprises matching each context ID to one or more corresponding terms in the plurality of matching terms.

18. The computer-implemented system according to claim 17, wherein the subject is mapped to the context IDs that comprise at least one of a language context ID or an industry solution context ID.

19. The computer-implemented system according to claim 15, wherein the SBM infrastructure comprises a semantic dictionary, wherein the semantic dictionary comprises one or more components comprising at least one of a plurality of synonyms, a plurality of specializations, a plurality of abbreviations, a plurality of spelling variations, a plurality of contraries, a plurality of acronyms, a plurality of generalizations, a plurality of compositions, a plurality of aggregations, a plurality of grammar rules, a plurality of language dependency rules, a plurality of syntaxes, a plurality of ambiguity rules, a plurality of contexts, or a plurality of probability factors associated with the plurality of terms in the SBM infrastructure.

20. The computer-implemented system according to claim 19, wherein the plurality of grammar rules comprise rules for at least one of spelling, punctuation, declination, or conjugation.

* * * * *